US008238689B2

(12) United States Patent
Inoue

(10) Patent No.: US 8,238,689 B2
(45) Date of Patent: Aug. 7, 2012

(54) DEVELOPMENT SERVER, DEVELOPMENT CLIENT, DEVELOPMENT SYSTEM, AND DEVELOPMENT METHOD

(75) Inventor: Kazunori Inoue, Tokyo (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 12/377,266

(22) PCT Filed: Dec. 20, 2007

(86) PCT No.: PCT/JP2007/074571
§ 371 (c)(1),
(2), (4) Date: Feb. 12, 2009

(87) PCT Pub. No.: WO2008/075745
PCT Pub. Date: Jun. 26, 2008

(65) Prior Publication Data
US 2010/0195929 A1  Aug. 5, 2010

(30) Foreign Application Priority Data
Dec. 21, 2006  (JP) .................. 2006-345001

(51) Int. Cl.
*G06K 9/40* (2006.01)
(52) U.S. Cl. ........ 382/274; 382/260; 382/275; 382/305; 358/3.26; 358/3.27; 358/463
(58) Field of Classification Search .............. 382/260, 382/274, 275, 305; 358/3.26, 3.27, 462
See application file for complete search history.

(56) References Cited

U.S. PATENT DOCUMENTS

| | | | | |
|---|---|---|---|---|
| 6,783,902 B2 * | 8/2004 | Szajewski et al. | ............... | 430/21 |
| 6,816,625 B2 * | 11/2004 | Lewis et al. | .................. | 382/275 |
| 7,128,270 B2 * | 10/2006 | Silverbrook et al. | ..... | 235/472.01 |
| 7,335,026 B2 * | 2/2008 | Goree et al. | .................... | 434/22 |
| 2005/0206734 A1 | 9/2005 | Kubo et al. | | |

FOREIGN PATENT DOCUMENTS

| | | |
|---|---|---|
| JP | 2003-234916 A | 8/2003 |
| JP | 2004-165797 A | 6/2004 |
| JP | 2004-258955 A | 9/2004 |
| JP | 2005-275454 A | 10/2005 |
| JP | 2006-133875 A | 5/2006 |

OTHER PUBLICATIONS

English language Abstract of JP 2004-165797 A (Jun. 10, 2004).
English language Abstract of JP 2006-133875 A (May 25, 2006).
English language Abstract of JP 2003-234916 A (Aug. 22, 2003).

* cited by examiner

*Primary Examiner* — Yosef Kassa
(74) *Attorney, Agent, or Firm* — Greenblum & Bernstein, P.L.C.

(57) ABSTRACT

A development server for more easily creating an image having a quality of image matching the desire and preference of the user from image data such as RAW data from which the user cannot develop. A development server (120) comprises a RAW receiving section (122) for receiving undeveloped image data, a temporarily-developed image creating section (124) for creating temporarily-developed images by simply developing undeveloped image data by applying correction parameters corresponding to respective mutually different qualities of image, a temporarily-developed image transmitting section (125) for combining temporarily-developed images with corresponding correction parameters applied to the respective temporarily-developed images and transmitting them to a development client (110), a correction parameter receiving section (126) for receiving a correction parameter applied to one of the temporarily-developed images from the development client (110) as an instruction to develop undeveloped image data, and a digital picture developing section (127) for creating developed image data by developing the undeveloped image data by applying the correction parameter specified by the development instruction.

16 Claims, 24 Drawing Sheets

| | | | | | | |
|---|---|---|---|---|---|---|
| +1EV 4000K | +1EV 5000K | +1EV 5500K | +1EV 6000K | +1EV 6500K | +1EV 7000K | +1EV 7500K |
| +2/3EV 4000K | +2/3EV 5000K | +2/3EV 5500K | +2/3EV 6000K | +2/3EV 6500K | +2/3EV 7000K | +2/3EV 7500K |
| +1/3EV 4000K | +1/3EV 5000K | +1/3EV 5500K | +1/3EV 6000K | +1/3EV 6500K | +1/3EV 7000K | +1/3EV 7500K |
| ±0EV 4000K | ±0EV 5000K | ±0EV 5500K | ±0EV 6000K | ±0EV 6500K | ±0EV 7000K | ±0EV 7500K |
| −1/3EV 4000K | −1/3EV 5000K | −1/3EV 5500K | −1/3EV 6000K | −1/3EV 6500K | −1/3EV 7000K | −1/3EV 7500K |
| −2/3EV 4000K | −2/3EV 5000K | −2/3EV 5500K | −2/3EV 6000K | −2/3EV 6500K | −2/3EV 7000K | −2/3EV 7500K |
| −1EV 4500K | −1EV 5000K | −1EV 5500K | −1EV 6000K | −1EV 6500K | −1EV 7000K | −1EV 7500K |

211

210 DATA TO BE CORRECTED

FIG.6

| | 401 |
|---|---|
| MANUFACTURER'S NAME | XXX CORPORATION |
| MODEL | YYY01 |
| IMAGING DATE AND TIME | 2006/10/1 10:01:02 |
| SHUTTER SPEED | 1/60 SEC |
| F VALUE | F5.6 |
| IMAGING MODE | PROGRAM AUTO |
| EXPOSURE CORRECTION VALUE | -0.3EV |
| FLASH MODE | NO FLASH |
| WHITE BALANCE (COLOR TEMPERATURE) | FINE WEATHER (5500K) |
| ISO SENSITIVITY | 100 |
| LENS FOCAL LENGTH | 50mm |
| METERING MODE | EVALUATIVE METERING |
| FOCUS MODE | SINGLE AF |
| COLOR SPACE | sRGB |
| ... | ... |

| | | 435 | | |
|---|---|---|---|---|
| | | MODEL NAME a | MODEL NAME b | MODEL NAME c |
| 431 { | ISO SENSITIVITY | 800 OR ABOVE | 400 OR ABOVE | 1600 OR ABOVE |
| 434 { | EXPOSURE CORRECTION VALUE | −2 EV OR BELOW OR +2 EV OR ABOVE | | |
| 432 { | EXPOSURE AMOUNT & WHITE BALANCE | EXPOSURE AMOUNT OF 13 EV OR ABOVE (DAYLIGHT OUTDOOR CONDITIONS) AND WHITE BALANCE NOT IN COLOR TEMPERATURE RANGE OF 4500 K TO 6000 K | | |
| | FLASH & WHITE BALANCE | FLASH USED AND WHITE BALANCE NOT IN COLOR TEMPERATURE RANGE OF 5400 K TO 5600 K | | |
| | IMAGING MODE & WHITE BALANCE | SCENIC MODE AND SHUTTER SPEED OF 1/60 SEC OR ABOVE AND WHITE BALANCE NOT IN COLOR TEMPERATURE RANGE OF 4000 K TO 7000 K | | |
| 433 { | UNDEREXPOSURE | BLANK SPACE PRESENT IN 1/3 OR MORE OF BRIGHT AREA OF HISTOGRAM | | |
| | OVEREXPOSURE | BLANK SPACE PRESENT IN 1/3 OR MORE OF DARK AREA OF HISTOGRAM | | |
| | INSUFFICIENT LATITUDE | DATA PEAKS PRESENT AT DARK END AND BRIGHT END OF HISTOGRAM | | |
| | COLOR SEEPAGE | MAJOR DIFFERENCES IN HISTOGRAM PEAKS FOR R, G, AND B | | |

FIG.16

| 601 | 602 |
|---|---|
| IMAGING DATE AND TIME | IMAGING INTERVAL WITHIN 10 SECONDS |
| IMAGING DATE AND TIME AND IMAGING MODE | IMAGING INTERVAL WITHIN 1 MINUTE AND IMAGING MODE UNCHANGED AND FLASH MODE UNCHANGED |
| IMAGING DATE AND TIME AND IMAGING CONDITIONS | IMAGING INTERVAL WITHIN 1 MINUTE AND IMAGING MODE UNCHANGED AND FLASH MODE UNCHANGED AND EXPOSURE AMOUNT OF ±0.5 EV OR BELOW WITH AUTOMATIC EXPOSURE |

600

| 801 | 802 | 803 | |
|---|---|---|---|
| FLASH USE | COLOR TEMPERATURE | DIFFERENCE BETWEEN DEFAULT COLOR TEMPERATURE WHEN USING FLASH AND CORRECTION PARAMETER COLOR TEMPERATURE | |
| EXPOSURE AMOUNT OF 14 EV OR ABOVE | COLOR TEMPERATURE | DIFFERENCE BETWEEN FINE-WEATHER COLOR TEMPERATURE WHEN EXPOSURE AMOUNT IS 14 EV OR ABOVE AND CORRECTION PARAMETER COLOR TEMPERATURE | |
| ISO SENSITIVITY 100 OR BELOW | NOISE REDUCTION AMOUNT | NOISE REDUCTION AMOUNT FOR ISO 100 OR BELOW | |
| ISO SENSITIVITY EXCEEDING 100 AND NOT EXCEEDING 200 | NOISE REDUCTION AMOUNT | NOISE REDUCTION AMOUNT FOR ISO 200 OR BELOW | |
| ISO SENSITIVITY EXCEEDING 200 AND NOT EXCEEDING 400 | NOISE REDUCTION AMOUNT | NOISE REDUCTION AMOUNT FOR ISO 400 OR BELOW | |
| ISO SENSITIVITY EXCEEDING 400 AND NOT EXCEEDING 800 | NOISE REDUCTION AMOUNT | NOISE REDUCTION AMOUNT FOR ISO 800 OR BELOW | |
| ISO SENSITIVITY EXCEEDING 800 AND NOT EXCEEDING 1600 | NOISE REDUCTION AMOUNT | NOISE REDUCTION AMOUNT FOR ISO 1600 OR BELOW | |
| ISO SENSITIVITY EXCEEDING 1600 | NOISE REDUCTION AMOUNT | NOISE REDUCTION AMOUNT FOR OVER ISO 1600 | |

FIG.20

DEVELOPMENT SERVER, DEVELOPMENT CLIENT, DEVELOPMENT SYSTEM, AND DEVELOPMENT METHOD

TECHNICAL FIELD

The present invention relates to a development server, development client, development system, and development method for developing image data that is difficult for an individual to develop, such as RAW data, for example.

BACKGROUND ART

Digital still cameras (DSCs) that perform imaging using an imaging device such as a CCD (charge coupled device) instead of photographic film are rapidly becoming increasingly popular, and offer continual major improvements in functions, performance, and image quality. In recent years, the market for digital single lens reflex cameras (DSLRs) targeting professional and advanced-amateur users, in particular, has shown remarkable growth. Many cameras positioned as such high-end models are provided with a RAW (unprocessed) imaging mode in addition to the commonly used JPEG (Joint Photographic Experts Group) imaging mode.

RAW imaging mode is an imaging mode in which image information captured by a CCD, CMOS (complementary metal oxide semiconductor), LiveMOS (registered trademark), or suchlike imaging device is recorded as almost unprocessed data (hereinafter referred to as "RAW data"). For example, CCD unprocessed image information is called CCD-RAW data. Compared with JPEG data that has undergone processing and compression processing, RAW data is larger in size but has the advantage of not being susceptible to image degradation due to missing information. Therefore, RAW imaging mode enables a photographic image, to be kept at the highest image quality that a camera has by recording a photographic image as RAW data.

A further advantage is that, when image adjustment (retouching) is executed on RAW data by providing various correction parameters after imaging, an image can be adjusted without breakdown over a much wider adjustment range than in the case of JPEG data. With JPEG data, since information is already missing, not only is the possible image quality adjustment range narrow, but also, depending on the adjustment content, there may be a sense of unnaturalness in terms of overall representation. For these reasons, not a few users of high-end digital still camera models prefer to use RAW imaging mode.

At present, however, manufacturers use their own proprietary data formats for RAW data. As a result, it is not possible for a user of a RAW imaging mode equipped camera to view RAW data directly via a general-purpose viewer on a personal computer, print RAW data on a general-purpose printer, or ask a general photographic printing company to print RAW data.

Thus, software is available on the market that converts RAW data to general-purpose still-image data for viewing or printing use, such as JPEG data, or to an actual viewable image (hereinafter referred to as "RAW development"). Such software is called RAW development software.

However, since RAW development software imposes a heavy processing load on a CPU (central processing unit), an information processing apparatus with considerable processing capability is necessary in order to perform RAW development using RAW development software. An information processing apparatus of this kind is normally expensive and has a large footprint, and is thus not easily provided by an individual.

Thus, a technology whereby RAW data captured on the user side is transmitted to a high-processing-capability server provided on a service provider's side, and development processing is performed in an intensive fashion by the server, has been described in Patent Document 1, for example.

FIG. 1 is an explanatory drawing showing the configuration and RAW development flow of a conventional development system.

Development system 10 has development server 20, which is an apparatus on the development service provision side, and development client 30, which is an apparatus on the user side. Development client 30 can access a recording medium such as a memory card used for RAW data recording by a digital still camera, and can communicate with development server 20.

Development client 30 first reads RAW data to be developed from a memory card or suchlike recording medium (S41), and transmits the read RAW data to development server 20 together with information relating to imaging conditions (S42). Development server 20 receives this RAW data (S43), performs development of the RAW data based on the imaging conditions, and generates image data such as JPEG data (S44).

Thus, a user can perform RAW development without providing a high-processing-capability information processing apparatus on the user side by having RAW development processing performed by a server.

A technology whereby an image is automatically adjusted to a color shade that tends to be judged to be pleasing to the human eye (hereinafter referred to as "memory color") is described in Patent Document 2, for example. By applying the technology described in Patent Document 2 to development processing by a development server, it becomes possible for a user to perform RAW development with an image quality generally deemed to be acceptable.

However, when image quality setting is performed automatically in this way, only an image of a standardized image quality can be obtained based on imaging conditions, and there is consequently little scope for a user to arbitrarily specify image quality for development.

Thus, a technology whereby development-time image quality is specified arbitrarily from the development client side has been described in Patent Document 3, for example. With the technology described in Patent Document 3, intuitive terminological expressions and keywords that can be easily handled even by a general user are associated in advance with correction parameter adjustment content. By applying the technology described in Patent Document 3 to development processing by a development server, it becomes possible for a user to specify development-time image quality arbitrarily.

Patent Document 1: Japanese Patent Application Laid-Open No. 2004-165797
Patent Document 2: Japanese Patent Application Laid-Open No. 2006-133875
Patent Document 3: Japanese Patent Application Laid-Open No. 2003-234916

DISCLOSURE OF INVENTION

Problems to be Solved by the Invention

However, a problem with the technology described in Patent Document 3 is that, unless a user grasps what kind of quality of image will actually be developed when a particular keyword is specified, a development result that meets the user's expectations cannot be obtained.

Thus, a possibility is for correction parameter adjustment work to be repeated until a development result that meets the user's expectations is obtained. However, correction parameters used when developing RAW data include a gamma curve, sharpness, noise reduction, and so forth, the adjustment ranges are wide, and all are related, so that it is difficult for a user immediately to obtain an image quality as envisaged without having appropriate knowledge and experience. Therefore, tasks are repeated until an image having an image quality conforming to the desire and preference of a user is obtained, entailing actual development of RAW data by the development server, adjustment of correction parameters by the development client based on that development result, and repeated development of RAW data by the development server.

However, in view of the fact that RAW development by a user entails an increased development server processing load, increased network load, and increased time until an image quality desired by the user is obtained, image quality adjustment by means of such repetition of development and adjustment tasks is impractical. There is thus a need for a development server and development method that enable an image having an image quality conforming to a user's desire and preference to be obtained more easily in the development of RAW data, which must of necessity be developed by a development server.

It is an object of the present invention to provide a development server, development client, development system, and development method that enable an image having an image quality conforming to a user's desire and preference to be obtained more easily in the development of RAW data, which is difficult for an individual to develop.

Means for Solving the Problems

A development server of the present invention employs a configuration having: an undeveloped image data receiving section that receives undeveloped image data; a temporarily-developed image generating section that generates a plurality of temporarily-developed images in which the undeveloped image data is developed simply by applying correction parameters corresponding to mutually different image qualities; a temporarily-developed image transmitting section that transmits the plurality of temporarily-developed images to a development client, combining the images with correction parameters applied to the respective temporarily-developed images or information indicating the parameters; a development instruction receiving section that receives from the development client a correction parameter applied to one of the plurality of temporarily-developed images or information indicating this as an instruction to develop the undeveloped image data; and a developing section that generates developed image data by developing the undeveloped image data by applying a correction parameter indicated by the development instruction.

A development client of the present invention employs a configuration having: an undeveloped image data transmitting section that transmits undeveloped image data to a development server that performs development of the undeveloped image data; a temporarily-developed image receiving section that receives from the development server a plurality of temporarily-developed images in which the undeveloped image data is developed simply by applying correction parameters corresponding to mutually different image qualities, combined with correction parameters applied to the respective temporarily-developed images or information indicating the parameters; a user interface section that displays the temporarily-developed images and accepts a user selection with respect to the temporarily-developed images; and a development instruction transmitting section that transmits to the development server a correction parameter applied to a temporarily-developed image selected by means of the user interface section or information indicating this as an instruction to develop the undeveloped image data.

A development system of the present invention employs a configuration equipped with the above-described development server and the above-described development client.

A development method of the present invention is a development method in a development server that develops undeveloped image data, and has: a step of receiving the undeveloped image data; a step of generating a plurality of temporarily-developed images in which received undeveloped image data is developed simply by applying correction parameters corresponding to mutually different image qualities; a step of transmitting the generated plurality of temporarily-developed images to a development client, combining the images with correction parameters applied to the respective temporarily-developed images or information indicating the parameters; a step of receiving from the development client a correction parameter applied to one of the transmitted plurality of temporarily-developed images or information indicating this as an instruction to develop the undeveloped image data; and a step of generating developed image data by developing the undeveloped image data by applying a correction parameter indicated by the received development instruction.

Advantageous Effect of the Invention

According to the present invention, a development server generates a plurality of temporarily-developed images developed simply by applying correction parameters to RAW data, and the work of a development client user is simplified to selection of these. By this means, the workload of a development client user can be reduced and many RAW images can be developed in conformity with the user's desire and preference. That is to say, an image having an image quality conforming to a user's desire and preference can be obtained more easily in the development of RAW data or suchlike image data that is difficult for an individual to develop.

BRIEF DESCRIPTION OF DRAWINGS

FIG. 6 is an explanatory drawing showing an example of temporarily-developed image data in Embodiment 1;

FIG. 11 is an explanatory drawing showing an example of the configuration of EXIF information in Embodiment 2;

FIG. 12 is an explanatory drawing showing an example of the configuration of a correction requirement rule table in Embodiment 2;

FIG. 16 is an explanatory drawing showing an example of the configuration of a similarity determination rule table in Embodiment 3;

FIG. 20 is an explanatory drawing showing an example of the configuration of a preference extraction rule table in Embodiment 4;

BEST MODE FOR CARRYING OUT THE INVENTION

Embodiments of the present invention will now be described in detail with reference to the accompanying drawings. Below, processing that generates JPEG data, which is data for viewing or printing, from RAW data, which is raw recorded data immediately after imaging, is referred to as "development". In each embodiment, a system will be described by way of example in which, for RAW data obtained by a digital still camera (hereinafter referred to as simply as "camera"), a user selects the image quality of a developed image using a family television connected to a network.

(Embodiment 1)

Figure 1:
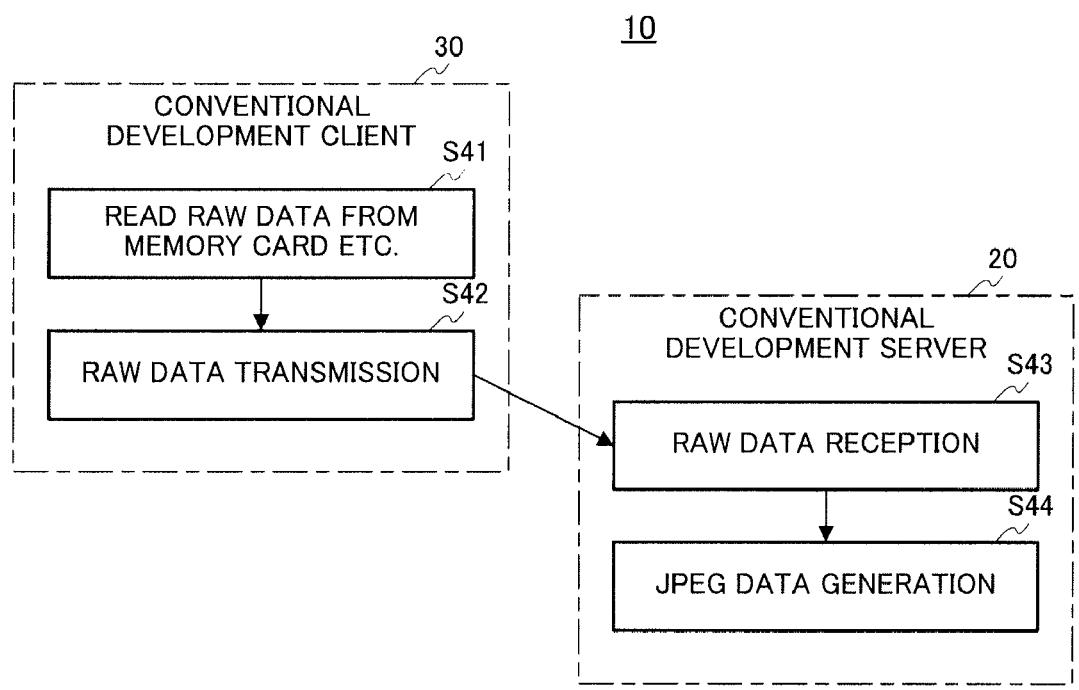
FIG. 1 is an explanatory drawing showing the configuration and RAW development flow of a conventional development system.
Figure 2:
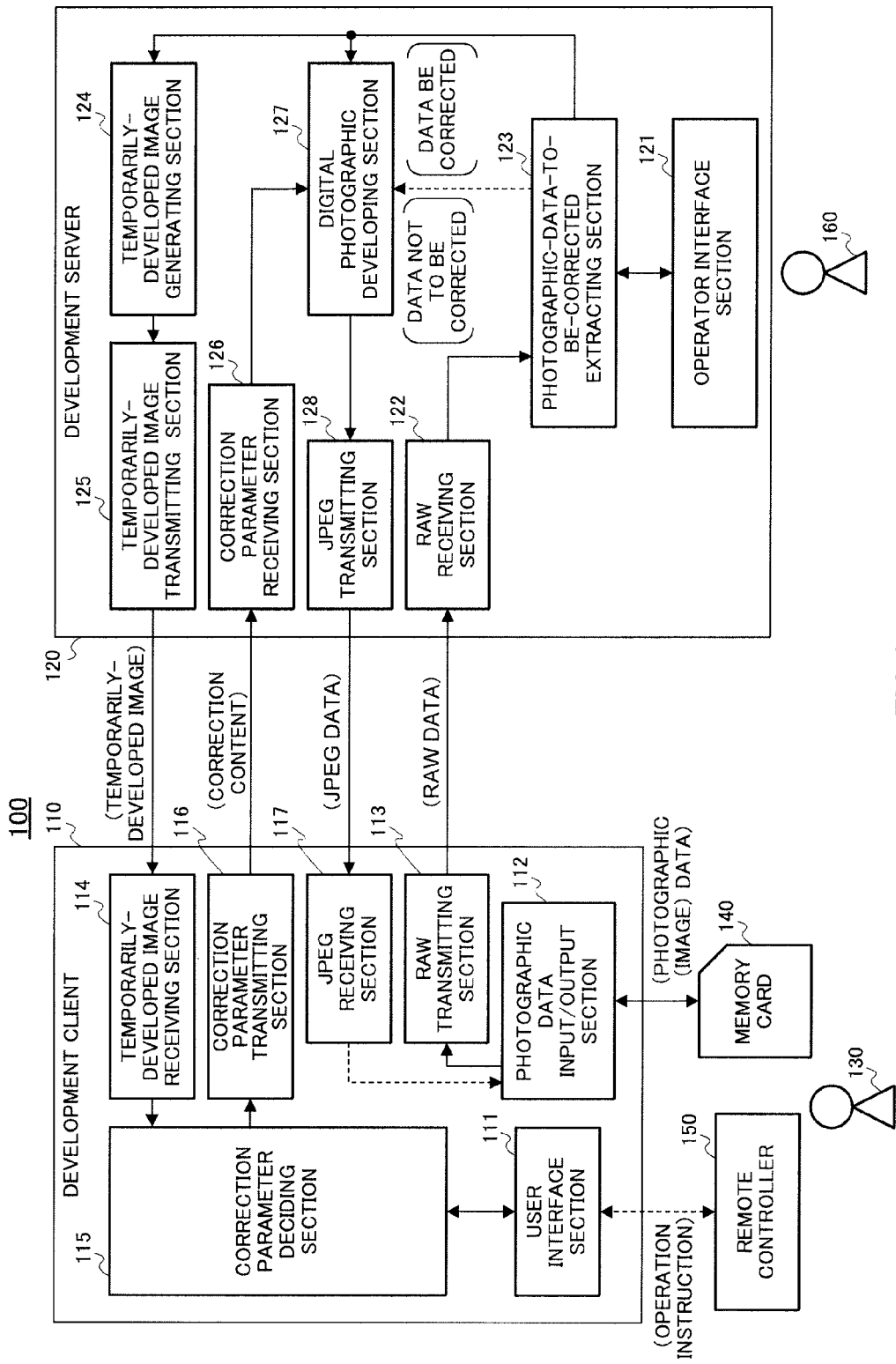
FIG. 2 is a system configuration diagram showing the configuration of a development system according to Embodiment 1 of the present invention.

FIG. 2 is a system configuration diagram showing the configuration of a development system according to Embodiment 1 of the present invention.

In FIG. 2, development system 100 has development client 110 to which RAW data is input, and development server 120, which is an apparatus on the side providing a RAW data development service. Development client 110 is a television installed in a home, and is connected so as to allow mutual communication to development server 120 via a network (not shown).

First, the main items of terminology used in the following description will be explained, and an overview of development system 100 will be given.

A temporarily-developed image is an image in a data format that allows high-speed display by development client 110. Such images are switched in succession by means of operations by user 130, and are used to allow the user to select a preferred image quality. A temporarily-developed image is an image developed by means of development processing that is simpler than development processing proper, and has image quality approximating that of image data (here, JPEG data) obtained by development processing proper. Simplification of development processing is achieved, for example, by reducing image resolution, color gradations, and so forth.

A correction parameter is a development parameter for setting a development condition for developing (actually developing and temporarily developing) RAW data. An actual image and temporarily-developed image to which the same correction parameters are applied are similar in terms of the image quality.

Examples of correction parameters include a brightness correction value, tone curve shape specification value, color temperature specification value, sharpness specification value, and noise reduction specification value. A brightness correction value is a correction parameter for increasing/decreasing the overall brightness of a photograph. A tone curve shape specification value is a correction parameter for performing fine tone adjustment. A color temperature specification value is a correction parameter for adjusting white balance. A sharpness specification value is a correction parameter for adjusting the degree of emphasis of an outline. A noise reduction specification value is a correction parameter for adjusting the amount of noise reduction.

These correction parameters basically define correction content relatively applied to an image recorded as original RAW data. Correction parameters generally include separate optional values for individual RAW data.

A basic parameter is a correction parameter in a state in which adjustment based on temporarily-developed image selection by a user has not been performed. This basic parameter is a default correction parameter that does not execute correction on imaging information including imaging conditions decided when shooting with a camera. These imaging conditions include, for example, exposure, white balance (color temperature), noise reduction amount with respect to photographic sensitivity, and so forth.

Development system 100 according to this embodiment performs correction parameter adjustment based on user selection with respect to temporarily-developed images. By this means, development system 100 develops RAW data with correction parameters corresponding to image quality conforming to a user's desire and preference without the user making correction parameter adjustments directly.

Next, the configuration of development client 110 will be described.

Development client 110 transmits RAW data (photographic data) obtained by imaging by means of a camera (not shown), and receives temporarily-developed images from development server 120. Then development client 110 shows the temporarily-developed images to the user, specifies image quality corresponding to a temporarily-developed image selected by user 130 using correction parameters described later herein, and instructs development server 120 to develop the RAW data.

Development client 110 has user interface section 111, photographic data input/output section 112, RAW transmitting section 113, temporarily-developed image receiving section 114, correction parameter deciding section 115, correction parameter transmitting section 116, and JPEG receiving section 117.

User interface section 111 has a liquid crystal display and a receiving section (neither of which is shown). The liquid crystal display displays images. The receiving section receives signals from remote controller 150 serving as an input apparatus. Using this liquid crystal display and receiving section, user interface section 111 shows various kinds of information to user 130 and accepts information input from user 130.

Photographic data input/output section 112 has a memory card slot (not shown) for inserting a memory card storage medium. Photographic data input/output section 112 performs input/output of information via electrical contacts from/to memory card 140 inserted in the memory card slot. For example, memory card 140 is inserted in the memory card slot as a storage medium for photographic data (RAW data) of a camera. In this case, photographic data input/output section 112 acquires RAW data from memory card 140, and outputs it to RAW transmitting section 113.

RAW data is undeveloped image information in which data obtained by performing A/D conversion of a light quantity captured by a CCD, CMOS, or suchlike imaging device in an image sensor using a Bayer array and arranged in matrix form in cell units is compressed using Huffman code. The information quantity of each cell is, for example, 12 bits or 16 bits. Individual pixels correspond to one color—R, G, or B.

RAW data identification information and imaging information are added to RAW data by the device that performs the imaging. Imaging information is information indicating imaging conditions such as the imaging date and time, number of pixels, exposure, white balance (color temperature), noise reduction amount with respect to photographic sensitivity, and so forth. RAW data is packaged as NEF format data with imaging information added, for example. Below, undeveloped image information, and data including undeveloped image information and accompanying imaging information, are referred to by the generic term "RAW data" where appropriate.

RAW transmitting section 113 transmits RAW data input from photographic data input/output section 112 to development server 120 as data subject to development. As described later herein, temporarily-developed image data including at least temporarily-developed images, correction parameters, and identification information, is sent back from development server 120. A temporarily-developed image sent back as temporarily-developed image data is an image obtained by simply developing RAW data transmitted by RAW transmitting section 113. When a correction parameter sent back as temporarily-developed image data is applied to development proper, JPEG data having an image quality visually equivalent (or close) to the image quality of a corresponding temporarily-developed image can be obtained. Identification information sent back as temporarily-developed image data is identification information of RAW data that is the basis of a temporarily-developed image.

Temporarily-developed image receiving section 114 receives temporarily-developed image data sent from development server 120, and outputs this data to correction parameter deciding section 115.

Correction parameter deciding section 115, in conjunction with user interface section 111, presents correction parameter choices to user 130. Then correction parameter deciding section 115 decides upon correction parameters to be used in RAW data development in accordance with a remote controller 150 operation by user 130.

Specifically, correction parameter deciding section 115 displays temporarily-developed images included in temporarily-developed image data on the liquid crystal display as correction parameter choices. Then, when one of the displayed temporarily-developed images is selected by a user operation, correction parameter deciding section 115 decides upon correction parameters added to the selected temporarily-developed image as correction parameters to be used in RAW data development.

For example, the following may be decided upon: "brightness correction value: plus 0.5 EV equivalent", "tone curve shape specification value: curve passing through (0,0), (128, 135), (255,255) for brightness input value, output value", "color temperature specification value: 6500 K", "sharpness specification value: standard plus 1", "noise reduction specification value: standard minus 3".

Correction parameter transmitting section 116 transmits the decided correction parameters—that is, correction parameter content corresponding to the image quality desired by user 130—to development server 120.

JPEG receiving section 117 receives JPEG data sent from development server 120. Then JPEG receiving section 117 writes the received JPEG data to memory card 140 via photographic data input/output section 112, and outputs the received JPEG data to the liquid crystal display via user interface section 111.

Next, the configuration of development server 120 will be described.

Development server 120 generates a plurality of temporarily-developed images developed by applying correction parameters corresponding to mutually different image qualities for data for which a correction parameter decision is necessary among RAW data sent from development client 110. Then development server 120 transmits the generated temporarily-developed images to development client 110, combining the images with correction parameters applied to those temporarily-developed images. Development server 120 develops RAW data in accordance with correction parameters decided by development client 110—that is, the development image quality desired by user 130.

Development server 120 has operator interface section 121, RAW receiving section 122, photographic-data-to-be-corrected extracting section 123, temporarily-developed image generating section 124, temporarily-developed image transmitting section 125, correction parameter receiving section 126, digital photograph developing section 127, and JPEG transmitting section 128.

Operator interface section 121 has a liquid crystal display (not shown) as a display apparatus, and a keyboard and mouse (neither of which is shown) as input apparatuses.

RAW receiving section 122 receives RAW data sent from development client 110, and outputs this data to photographic-data-to-be-corrected extracting section 123.

Photographic-data-to-be-corrected extracting section 123 classifies RAW data as data to be corrected or data not to be corrected in accordance with an operator interface section 121 operation by operator 160. Then photographic-data-to-be-corrected extracting section 123 outputs data to be corrected and data not to be corrected to digital photograph developing section 127, and outputs only data to be corrected to temporarily-developed image generating section 124.

Data to be corrected is RAW data subject to correction parameter adjustment—that is, RAW data to which correction parameters adjusted based on a user 130 selection are applied. Data not to be corrected is RAW data not subject to correction parameter adjustment—that is, RAW data to which basic parameters are applied directly.

Temporarily-developed image generating section 124 generates a plurality of temporarily-developed images corresponding to different image qualities—that is, a plurality of temporarily-developed images to which different correction parameters have been applied—from data to be corrected. Then temporarily-developed image generating section 124 outputs temporarily-developed image data in which correction parameters and identification information have been added to the generated temporarily-developed images to temporarily-developed image transmitting section 125.

As stated above, correction parameters sent back as this temporarily-developed image data are correction parameters for obtaining JPEG data having an image quality corresponding to the respective temporarily-developed images. Also, as stated above, identification information sent back as temporarily-developed image data is identification information of RAW data that is the basis of a temporarily-developed image.

Temporarily-developed image transmitting section 125 transmits the temporarily-developed image data to development client 110.

Correction parameter receiving section 126 receives correction parameters added to a temporarily-developed image selected by user 130—that is, correction parameters corresponding to image quality selected by user 130—from development client 110. Then correction parameter receiving section 126 outputs the received correction parameters to digital photograph developing section 127.

For data not to be corrected, digital photograph developing section 127 performs conversion to JPEG data without performing image quality correction. On the other hand, for data to be corrected, digital photograph developing section 127 performs image quality correction in accordance with correction parameters input from correction parameter receiving section 126, and performs conversion to JPEG data. Digital photograph developing section 127 outputs the generated JPEG data to JPEG transmitting section 128.

JPEG transmitting section 128 transmits the JPEG data to development client 110.

Although not shown, development server 120 and development client 110 each have a CPU, a storage medium such as ROM (read only memory) that stores a control program, working memory such as RAM (random access memory), a communication circuit, and so forth. The functions of the above sections are implemented by execution of the control program by the CPU.

The operation of each section will now be described in detail using one example of actual data flow.

Figure 3:
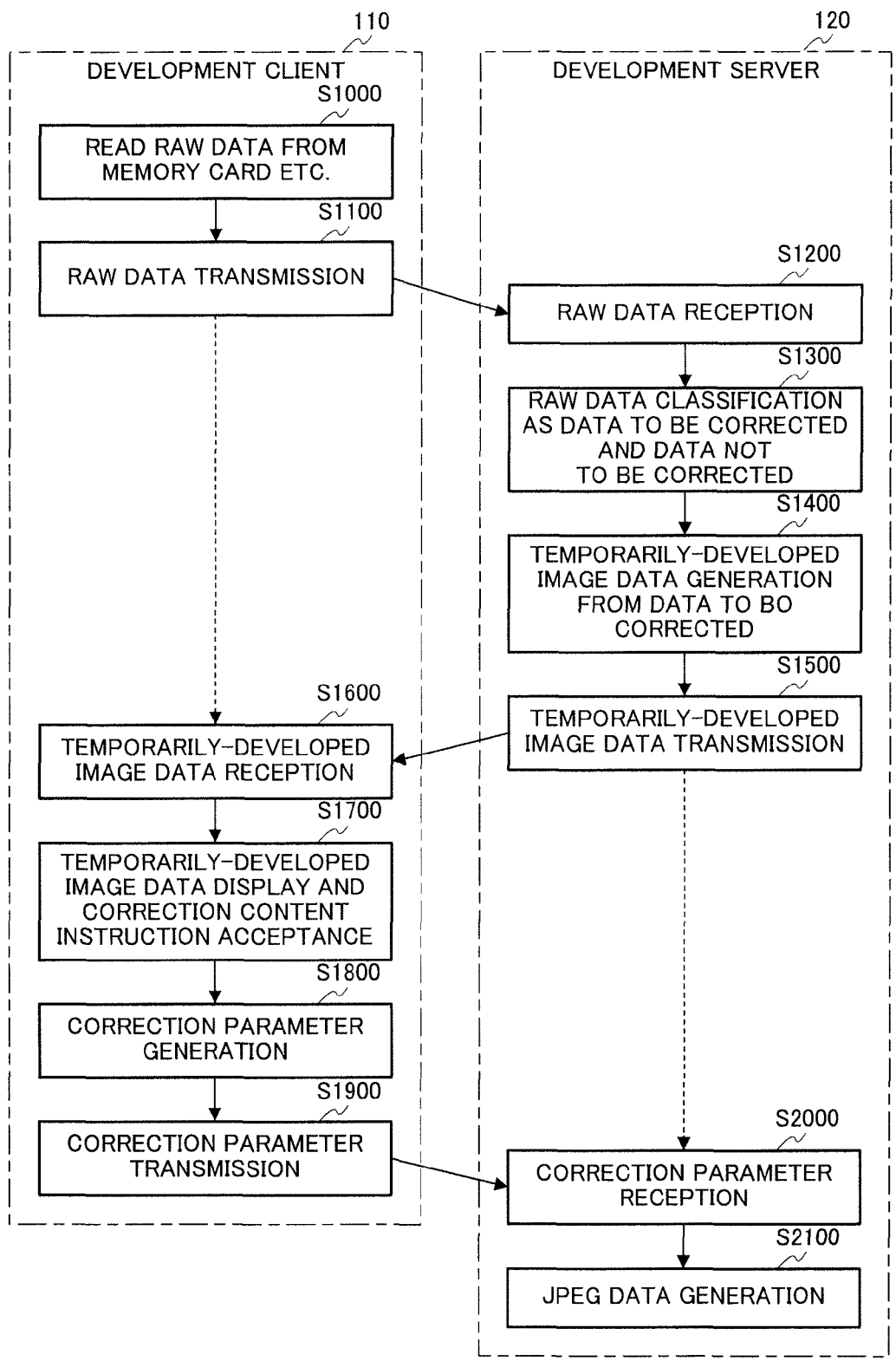
FIG. 3 is a sequence diagram showing the RAW development flow in Embodiment 1.

FIG. 3 is a sequence diagram showing the RAW development flow in Embodiment 1. In FIG. 3, processing executed by development client 110 is shown on the left, and processing executed by development server 120 is shown on the right.

First, in step S1000, photographic data input/output section 112 of development client 110 reads RAW data from memory card 140, and outputs the read RAW data to RAW transmitting section 113. Imaging information is added to this RAW data as described above.

Next, in step S1100, RAW transmitting section 113 of development client 110 transmits the RAW data to development server 120.

Then, in step S1200, RAW receiving section 122 of development server 120 receives the RAW data transmitted from development client 110 in step S1100, and outputs the received RAW data to photographic-data-to-be-corrected extracting section 123.

Next, in step S1300, photographic-data-to-be-corrected extracting section 123 classifies the RAW data as data to be corrected or data not to be corrected. Specifically, photographic-data-to-be-corrected extracting section 123 executes RAW data classification processing. RAW data classification processing classifies data as data to be corrected or data not to be corrected according to an operator 160 operation via operator interface section 121. In the following description, a case will be assumed in which a plurality of RAW data are transmitted from development client 110 to development server 120 as a mass of data, and development is performed on the mass of data.

Figure 4:
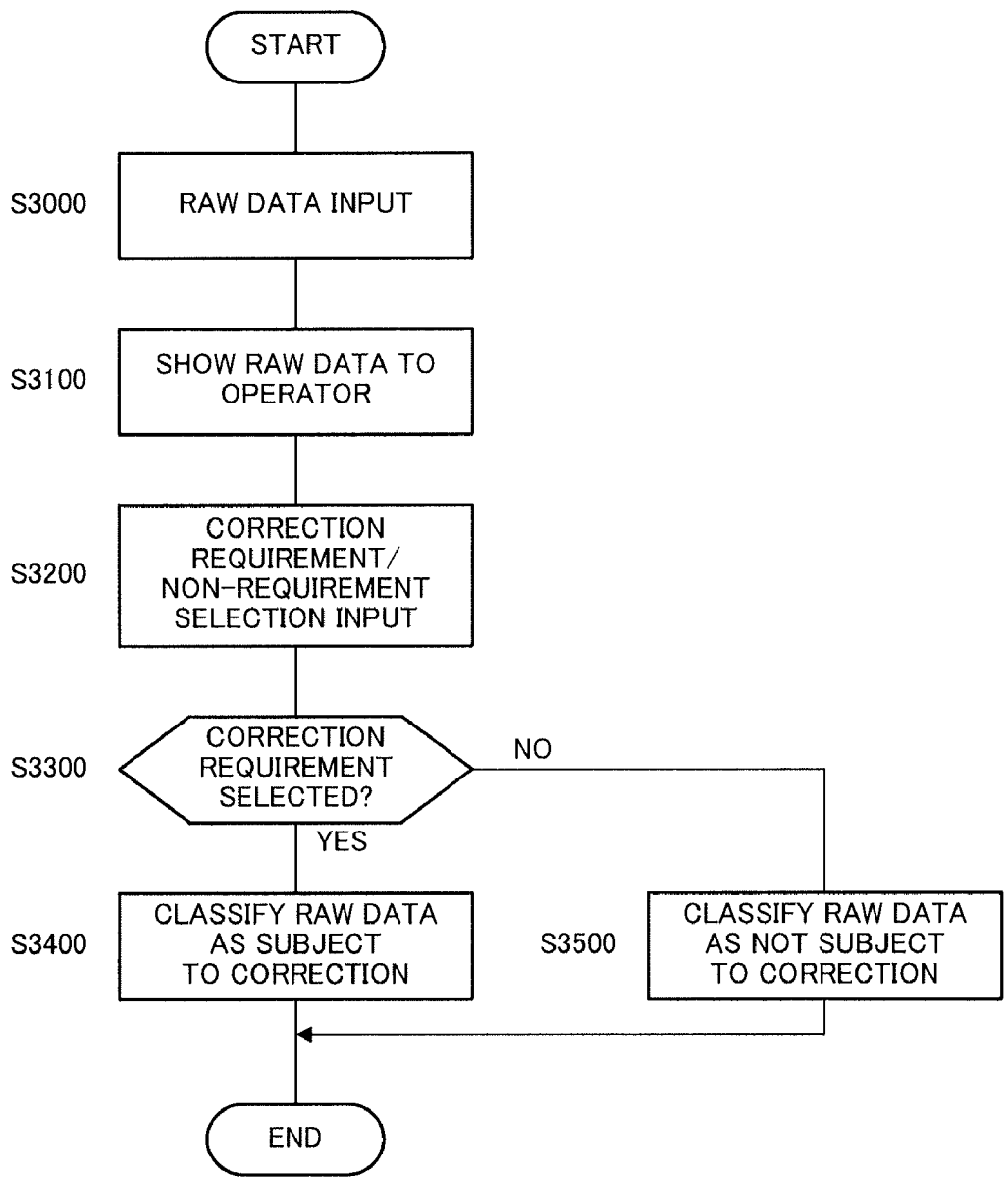
FIG. 4 is a flowchart showing the flow of RAW data classification processing in Embodiment 1.

FIG. 4 is a flowchart showing the flow of RAW data classification processing by photographic-data-to-be-corrected extracting section 123.

First, in step S3000, photographic-data-to-be-corrected extracting section 123 has a mass of RAW data sent from development client 110 as input.

Next, in step S3100, photographic-data-to-be-corrected extracting section 123 shows the RAW data input from RAW receiving section 122 to operator 160 using the liquid crystal panel of operator interface section 121. Specifically, photographic-data-to-be-corrected extracting section 123 generates a correction requirement input screen, and displays the generated correction requirement input screen on the liquid crystal panel. The correction requirement input screen is a screen for showing details of RAW data including imaging information added to RAW data, and for inputting a result of determination by operator 160 as to which RAW data requires correction.

Figure 5:
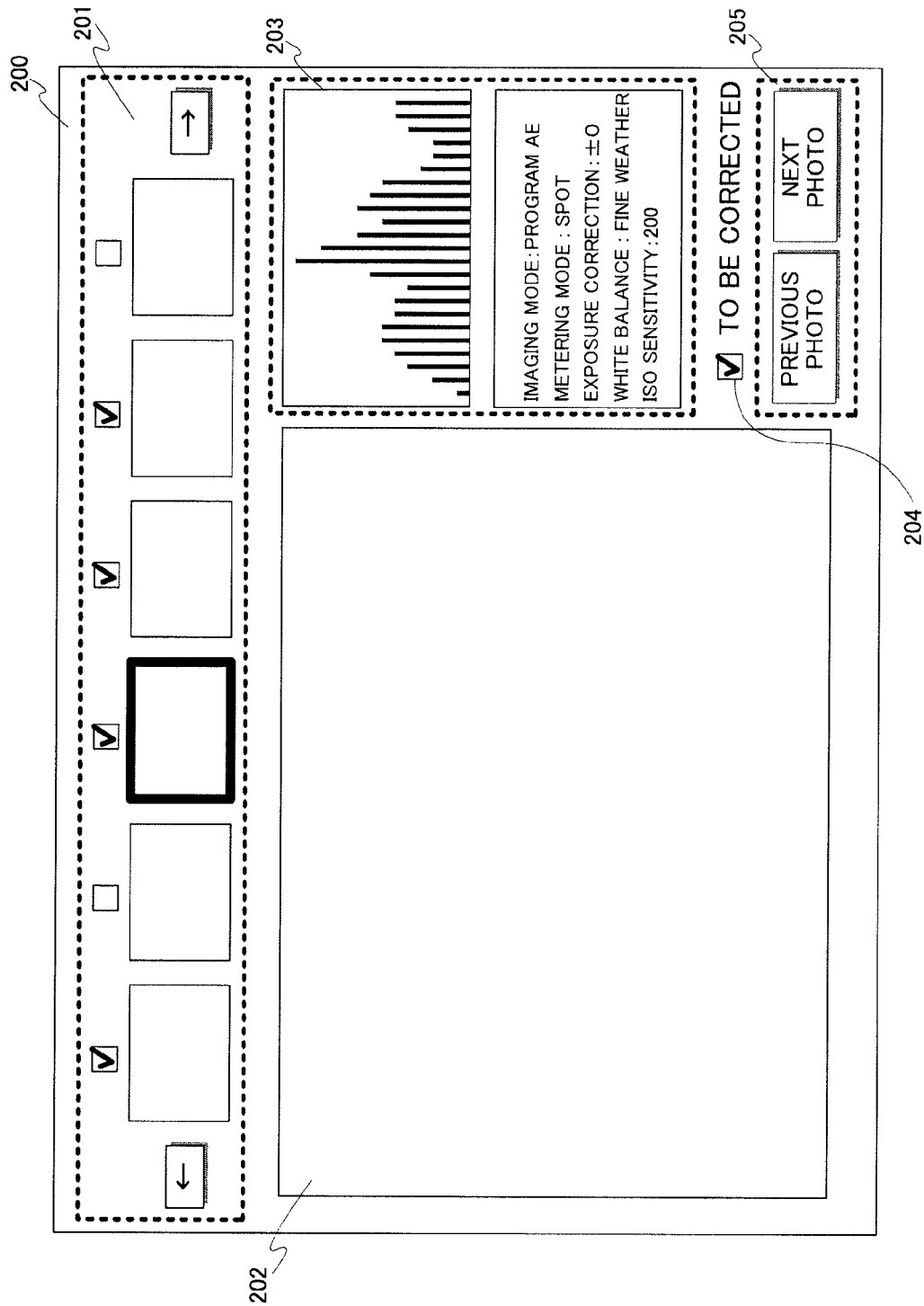
FIG. 5 is an explanatory drawing showing an example of a correction requirement input screen in Embodiment 1.

FIG. 5 is an explanatory drawing showing an example of a correction requirement input screen.

As shown in FIG. 5, correction requirement input screen 200 has RAW image series display area 201, RAW image display area 202, imaging information display area 203, correction requirement checkbox 204, and operation area 205.

In RAW image series display area 201, a series of RAW data (thumbnail images) are displayed as temporarily-developed images to which basic parameters have been applied (hereinafter referred to as "basic temporarily-developed images"). In addition, the results of decisions as to whether or not correction is necessary for each RAW data are displayed in RAW image series display area 201. A basic temporarily-developed image is an image visually equivalent (or close) to the result of development with basic parameters applied to RAW data.

In RAW image display area 202, a RAW data basic temporarily-developed image (hereinafter referred to as "RAW image") subject to operator determination input is displayed.

In imaging information display area 203, a supplementary display is provided of information accompanying a RAW image displayed in RAW image display area 202, such as a histogram indicating image brightness distribution, imaging conditions set in a camera when imaging was performed, and so forth.

By checking or not checking correction requirement checkbox 204, operator 160 can specify whether or not RAW data that is the basis of a RAW image displayed in RAW image display area 202 should be made data to be corrected.

Operation area 205 contains various display elements, operation buttons, and so forth, supporting operator 160 operations. Thumbnail images, basic temporarily-developed images, histograms, and so forth are created by, for example, analyzing RAW data by photographic-data-to-be-corrected extracting section 123.

Depending on the RAW data, a thumbnail image may also be added. In this case, photographic-data-to-be-corrected extracting section 123 acquires a thumbnail image from the RAW data.

By referring to a display image in RAW image display area 202 and the contents of imaging information display area 203, operator 160 shown in FIG. 2 can determine on an individual basis whether or not RAW data displayed in RAW image series display area 201 should be made data to be corrected. Also, operator 160 can input his/her own determination result by checking or not checking correction requirement checkbox 204 using the keyboard or mouse of operator interface section 121 shown in FIG. 2.

For example, in the case of RAW data for which exposure correction, white balance (color temperature), adjustment of the noise reduction amount with respect to photographic sensitivity, and so forth, were all set appropriately by the photographer when performing imaging with a camera, development results evoking no sense of unnaturalness can be obtained even if automatic development is performed using basic parameters. If photographic-data-to-be-corrected extracting section 123 also makes RAW data recorded under such imaging conditions subject to image quality correction, a greater number of temporarily-developed images will be shown to user 130, and the workload of user 130 will increase. Therefore, RAW data for which there is no problem even if only basic parameters are used should be made data not to be corrected.

On the other hand, cases may also occur in which inappropriate settings were made for the above parameters when performing imaging with a camera, and automatic exposure, automatic white balance, and suchlike controls by the camera do not function adequately. If automatic development is performed with basic parameters in such cases, brightness, color tones, noise quantity, and so forth may be outside appropriate ranges, and development results evoking a sense of unnaturalness may result. RAW data recorded under such imaging conditions—that is, RAW data for which imaging has failed—should be made subject to correction.

It is easy for operator 160 having specialized knowledge and experience relating to image processing to identify such RAW data for which imaging has failed from a display image in RAW image display area 202 and the contents of imaging information display area 203. Therefore, operator 160 can decide accurately and speedily whether or not image quality should be corrected by means of correction requirement input screen 200.

In step S3200 in FIG. 4, photographic-data-to-be-corrected extracting section 123 has a selection result as to whether or not correction is required for RAW data, obtained by correction requirement input screen 200 shown in FIG. 5, as input.

Next, in step S3300, photographic-data-to-be-corrected extracting section 123 determines whether or not correction requirement has been selected for respective RAW data. Photographic-data-to-be-corrected extracting section 123 proceeds to step S3400 in the case of RAW data for which correction requirement has been selected (S3300: YES), or to step S3500 in the case of RAW data for which correction requirement has not been selected (S3300: NO).

In step S3400, photographic-data-to-be-corrected extracting section 123 classifies RAW data for which correction requirement has been selected as subject to correction, and outputs this data to temporarily-developed image generating section 124 and digital photograph developing section 127.

On the other hand, in step S3500, photographic-data-to-be-corrected extracting section 123 classifies RAW data for which correction requirement has not been selected as not subject to correction, and outputs this data to digital photograph developing section 127.

When photographic-data-to-be-corrected extracting section 123 has classified amass of data sent from development client 110 as data to be corrected and data not to be corrected, it terminates RAW data classification processing. Then development server 120 processes to the processing in step S1400 in FIG. 3.

In step S1400 in FIG. 3, temporarily-developed image generating section 124 of development server 120 generates a temporarily-developed image by performing the above-described simple development processing on data to be corrected. Then temporarily-developed image generating section 124 outputs temporarily-developed image data in which correction parameters and identification information have been added to a generated temporarily-developed image to temporarily-developed image transmitting section 125.

From one item of data to be corrected, temporarily-developed image generating section 124 generates a plurality of temporarily-developed images to which correction parameters corresponding to respective different image qualities have been applied according to the number and adjustment width of correction parameters shown to user 130 as choices.

FIG. 6 is an explanatory drawing showing an example of temporarily-developed image data generated from one item of data to be corrected.

As shown in FIG. 6, when data to be corrected 210 corresponding to RAW data is input, temporarily-developed image generating section 124 generates temporarily-developed image data 211 comprising a plurality of temporarily-developed images with different correction parameters and accompanying information. The accompanying information includes correction parameters corresponding to the respective temporarily-developed images. In FIG. 6, each of the plurality of boxes making up temporarily-developed image data 211 corresponds to one temporarily-developed image. Also, in FIG. 6, respective correction parameters are shown as image quality adjustment parameters comprising an exposure adjustment value (above) and color temperature (below).

Here, a case is illustrated in which the possible exposure correction value adjustment range is minus 1 EV (exposure value) to plus 1 EV, and the exposure correction value adjustment interval is ⅓ EV. Also, a case is illustrated in which the possible color temperature adjustment range is 4500 K (kelvin) to 7500 K, and the color temperature adjustment interval is 500 K.

In this case, as shown in FIG. 6, temporarily-developed images are generated on which a total of 49 adjustments, comprising combinations of 7 exposure correction values and 7 color temperatures, have been executed. The image qualities of the respective temporarily-developed images approximate the image quality of an image obtained when imaging is performed by applying the corresponding image quality adjustment parameters.

In step S1500 in FIG. 3, temporarily-developed image transmitting section 125 of development server 120 transmits temporarily-developed image data input from temporarily-developed image generating section 124 to development client 110. Here, it is assumed that temporarily-developed image data 211 shown in FIG. 6 is transmitted. If there are many temporarily-developed images, temporarily-developed image data 211 may transmit them in multiple batches.

Next, in step S1600, temporarily-developed image receiving section 114 of development client 110 receives temporarily-developed image data 211 sent from development server 120, and outputs received temporarily-developed image data 211 to correction parameter deciding section 115.

Then, in step S1700, correction parameter deciding section 115 of development client 110 displays temporarily-developed image data 211, and accepts a correction content instruction from user 130 via user interface section 111. Specifically, correction parameter deciding section 115 accepts a user 130 instruction as to whether a series of temporarily-developed images are to be shown as a selection display or a switched display. Then correction parameter deciding section 115 shows user 130 a series of temporarily-developed images based on temporarily-developed image data 211 in a display format in accordance with the instruction by user 130. Temporarily-developed images shown are JPEG data image quality choices and correction parameter choices.

When an instruction has been given for selection display, correction parameter deciding section 115 generates a temporarily-developed image selection display screen in which a plurality of temporarily-developed images are arranged in one screen, and displays this on the liquid crystal panel.

Figure 7:
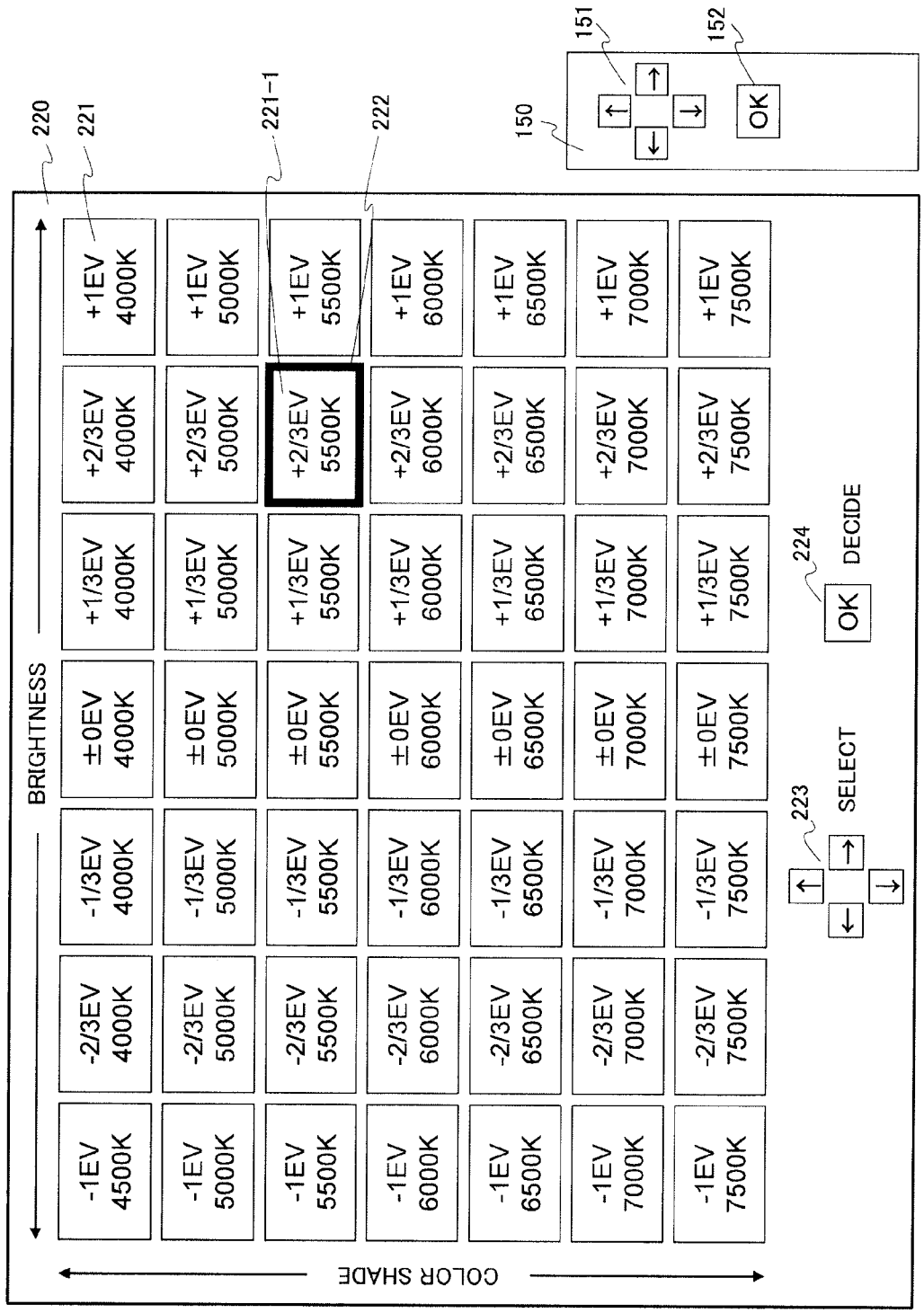
FIG. 7 is an explanatory drawing showing an example of a temporarily-developed image selection display screen in Embodiment 1.

FIG. 7 is an explanatory drawing showing an example of a temporarily-developed image selection display screen. FIG. 7 also shows an external view of the operation surface of remote controller 150.

As shown in FIG. 7, temporarily-developed image selection display screen 220 has temporarily-developed images 221, frame 222, selection keys 223, and decision key 224.

Temporarily-developed images 221 are temporarily-developed images based on temporarily-developed image data 211. Here, temporarily-developed images 221 are arranged in matrix form in a sequence based on exposure adjustment value and color temperature.

Frame 222 is used to select temporarily-developed images 221, and can be moved to any temporarily-developed image 221 by means of selection key 223 operations.

Decision key 224 is for deciding upon temporarily-developed image 221 selected using frame 222 as temporarily-developed image 221 specified by user 130. Selection key 223 and decision key 224 operations are performed, for example, in correspondence to operations of direction keys 151 and "OK" key 152 for decision input provided on remote controller 150. If there are many temporarily-developed images 221, the number of temporarily-developed images 221 displayed on the liquid crystal panel at one time may be reduced by means of scrolling or page switching.

Assume, for example, that decision key 224 is pressed while frame 222 is positioned at temporarily-developed image 221-1 for which the exposure correction value is plus ⅔ EV and the color temperature is 5500 K. In this case, correction parameter deciding section 115 determines that image quality adjustment parameters "exposure correction value: plus ⅔ EV, color temperature: 5500 K" have been selected by user 130.

On the other hand, if an instruction has been given for switched display, correction parameter deciding section 115 displays on the liquid crystal panel a temporary screen switching display screen, in which temporarily-developed images are positioned, switched between one by one, in one screen.

Figure 8:
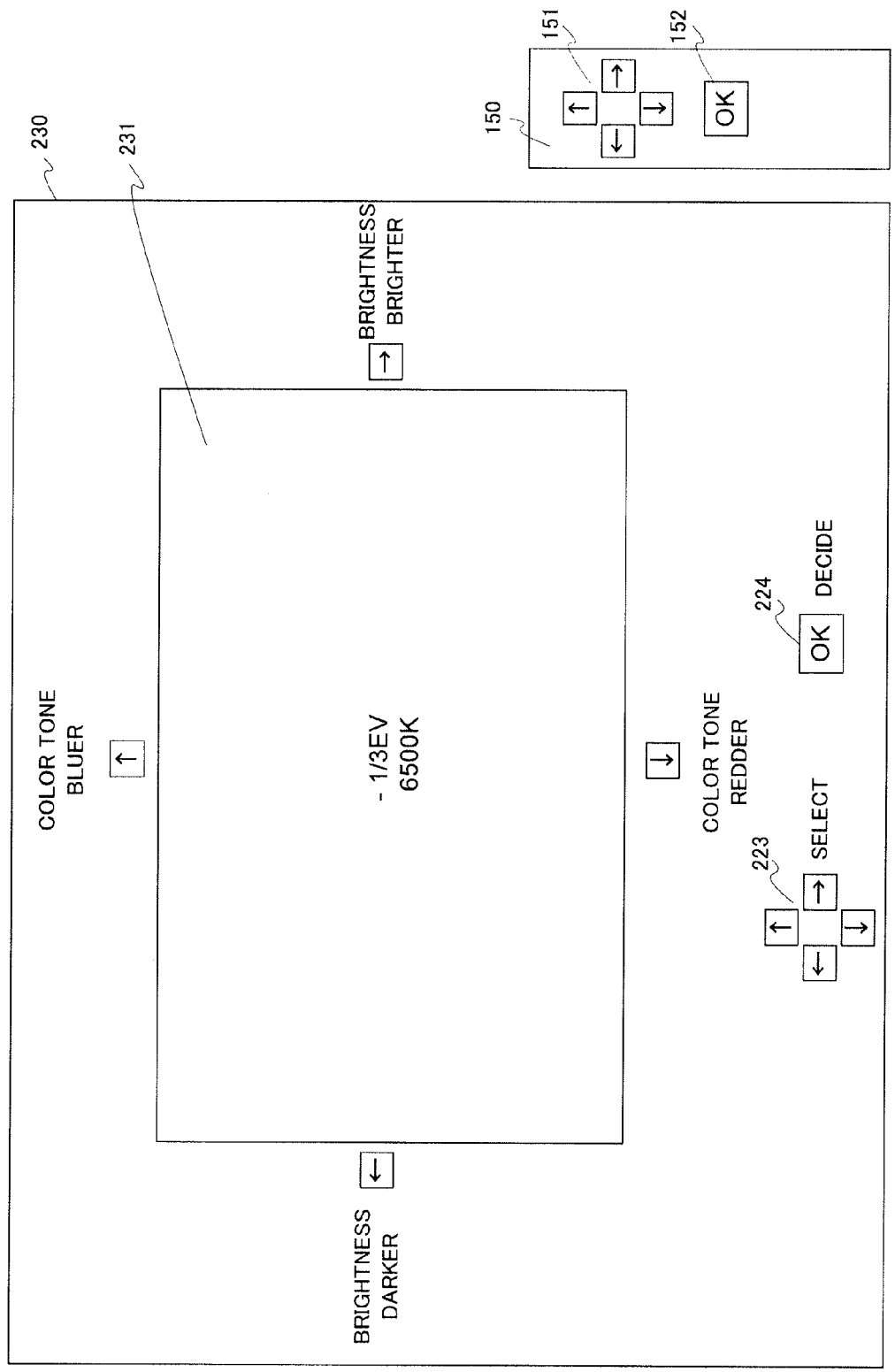
FIG. 8 is an explanatory drawing showing an example of a temporary screen switching display screen in Embodiment 1.

FIG. 8 is an explanatory drawing showing an example of a temporary screen switching display screen, corresponding to FIG. 7. Parts identical to those in FIG. 7 are assigned the same reference codes as in FIG. 7, and descriptions thereof are omitted here.

As shown in FIG. 8, temporary screen switching display screen 230 has temporarily-developed image display area 231. Temporarily-developed image display area 231 is an area for providing a large-size display of a currently selected temporarily-developed image. Information indicating how the temporarily-developed image displayed in temporarily-developed image display area 231 changes when selection keys 223 are operated is displayed around temporarily-developed image display area 231.

For example, as shown in FIG. 8, "Brightness: brighter" is displayed to the right of temporarily-developed image display area 231. This indicates that, when the right direction is decided upon with selection keys 223, a switch is made to display of another temporarily-developed image whose brightness is one level higher. Here, it will be assumed that a temporarily-developed image corresponding to image quality adjustment parameters "exposure correction value: minus ⅓ EV, color temperature: 6500 K" is being displayed. If decision key 224 is pressed in this state, correction parameter deciding section 115 determines that image quality adjustment parameters "exposure correction value: minus ⅓ EV, color temperature: 6500 K" have been selected, and stores image quality adjustment parameters corresponding to the currently selected temporarily-developed image. Also, if, for example, the right direction is decided upon with selection keys 223, correction parameter deciding section 115 switches to display of a temporarily-developed image corresponding to image quality adjustment parameters "exposure correction value: plus/minus 0 EV, color temperature: 6500 K".

In step S1800 in FIG. 3, correction parameter deciding section 115 of development client 110 outputs correction parameters and identification information corresponding to the selected temporarily-developed image to correction parameter transmitting section 116.

In step S1900, correction parameter transmitting section 116 of development client 110 transmits the correction parameters and identification information input from correction parameter deciding section 115 to development server 120.

In step S2000, correction parameter receiving section 126 of development server 120 receives the correction parameters and identification information sent from development client 110, and passes the received correction parameters and identification information to digital photograph developing section 127.

In step S2100, when the correction parameters and identification information are input from correction parameter receiving section 126, digital photograph developing section 127 of development server 120 performs development processing by applying the correction parameters to data to be corrected corresponding to the identification information, and generates JPEG data. That is to say, digital photograph developing section 127 develops RAW data using correction content specified by the user. The JPEG data obtained in this way is not an image of standard image quality obtained by applying basic parameters, but an image having an image quality visually equivalent (or close) to an image having an image quality selected by user 130 by viewing temporarily-developed images.

Then JPEG transmitting section 128 of development server 120 transmits the JPEG data generated by digital photograph developing section 127 to development client 110. JPEG receiving section 117 of development client 110 receives this JPEG data, and, for example, writes it to memory card 140 via photographic data input/output section 112.

In this way, temporarily-developed images are displayed by development client 110, and a temporarily-developed image selection by user 130 is accepted. Then development server 120 develops RAW data using correction parameters corresponding to the selected temporarily-developed image, and generates JPEG data that is image data allowing simple image output. JPEG data written to memory card 140 can be used, for example, by various devices equipped with a memory card slot.

Development system 100 may also perform the temporarily-developed image data transmission/reception and display processing in steps S1500 through S1700 on a one-by-one individual temporarily-developed image basis according to user operations via user interface section 111. In this case, for example, development client 110 receives only temporarily-developed image data corresponding to a temporarily-developed image selected by user 130 from development server 120 whenever necessary. Then development client 110 adds a browse display screen that shows a temporarily-developed image for received temporarily-developed image data.

Figure 9:
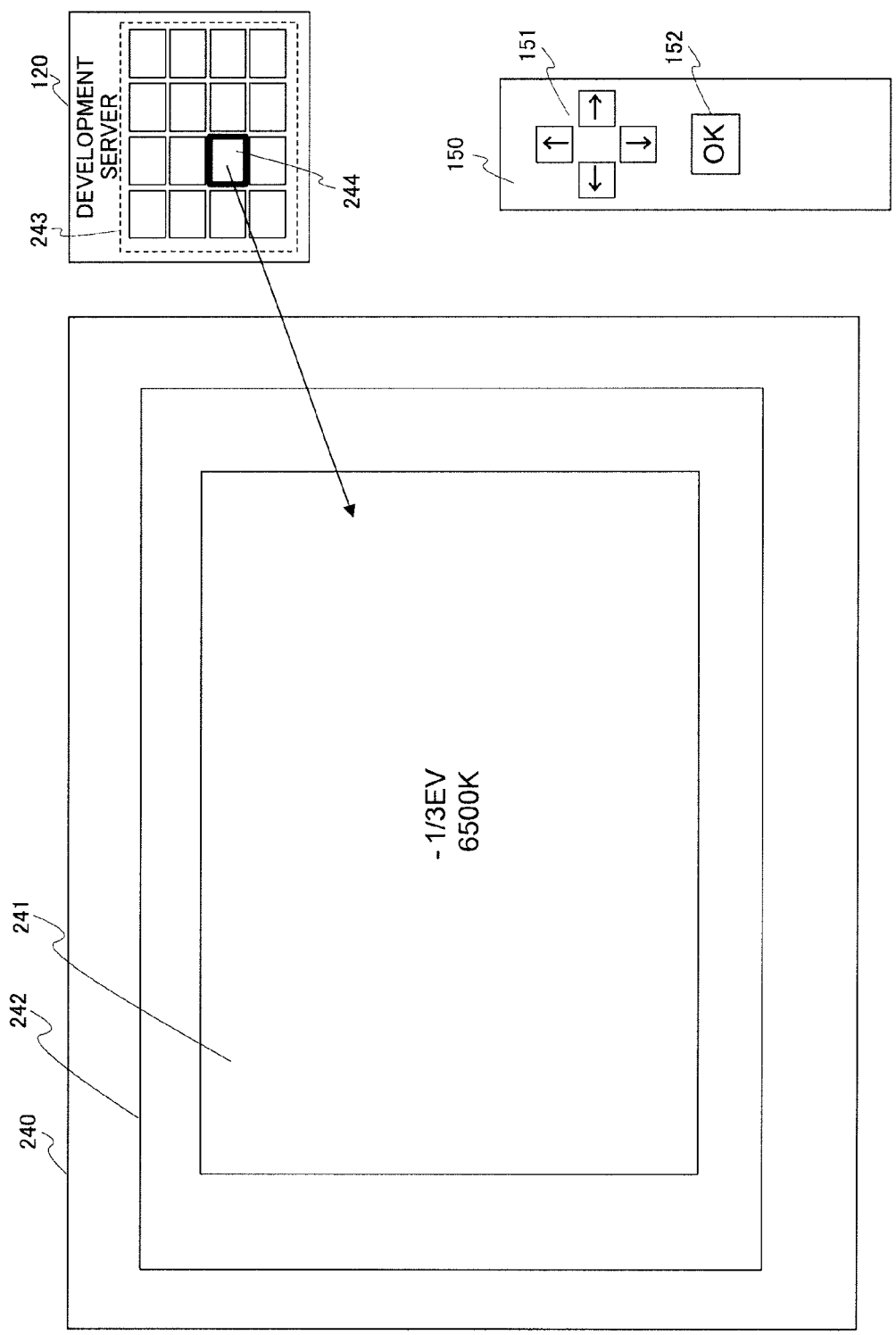
FIG. 9 is an explanatory drawing showing an example of a browse display screen in Embodiment 1.

FIG. 9 is an explanatory drawing showing an example of a browse display screen, corresponding to FIG. 8. Parts identical to those in FIG. 8 are assigned the same reference codes as in FIG. 8, and an example of temporarily-developed image data generated by development server 120 is also shown.

As shown in FIG. 9, browse display screen 240 has browser 242 in which temporarily-developed image display area 241 that displays a temporarily-developed image is located. Browse display screen 240 is a screen displayed by development client 110, but temporarily-developed image data 243 constituting its basis is, for example, a combination of HTML (hypertext markup language) data and JPEG image data linked from or inserted in HTML data, and is generated by development server 120.

Development server 120 generates temporarily-developed image data 243 of a plurality of temporarily-developed images including data part 244 corresponding to a specific temporarily-developed image. Then development server 120 first transmits only data part 244 to development client 110.

Correction parameter deciding section 115 displays only a temporarily-developed image based on data part 244 sent from development server 120 in temporarily-developed image display area 241. Then correction parameter deciding section 115 issues a request to development server 120 for corresponding other temporarily-developed image data according to an operation of direction keys 151 of remote controller 150, and when the corresponding data part is sent back, switches to display of a temporarily-developed image based on that data part. Then, when "OK" key 152 of remote controller 150 is pressed while one of the temporarily-developed images is being displayed in temporarily-developed image display area 241, correction parameter deciding section 115 determines that the temporarily-developed image being displayed has been selected.

As described above, according to this embodiment, in development system 100, development server 120 extracts data to be corrected and generates RAW data temporarily-developed images, transmits the generated temporarily-developed images to development client 110, combining the images with correction parameters to be applied to those temporarily-developed images. On the other hand, in development system 100, development client 110 displays temporarily-developed images as JPEG data image quality choices, transmits a correction parameter applied to a selected temporarily-developed image to development server 120 as a RAW data development instruction, and causes development server 120 to perform development to which that correction parameter has been applied. By this means, user 130 can select a correction parameter by checking temporarily-developed images. Also, development client 110 need not perform any particular processing to generate temporarily-developed images. Therefore, an image having an image quality conforming to the desire and preference of user 130 can be obtained as a development result, while suppressing the load on user 130, even with RAW data for which development and temporarily-developed image generation are difficult for an individual.

Also, in development system 100, development server 120 reduces the number of images subject to correction by classifying RAW data. By this means, development server 120 can reduce the number of temporarily-developed images transmitted to development client 110, and can reduce the load on the network. Also, since the number of temporarily-developed images checked by user 130 is reduced, the load on the user 130 can be reduced. Furthermore, since the number of temporarily-developed images shown is reduced, a simpler showing means can be used as a means of showing correction parameter choices to user 130, and a user interface can be implemented that allows the task of image quality adjustment to be performed by means of a simple operation. That is to say, it is possible to select a correction parameter corresponding to an image quality that conforms to the preference of user 130 by direct use of a simple input device such as a television remote controller.

The possible adjustment range and width of an exposure adjustment value and color temperature illustrated in FIG. 6 and FIG. 7 may each be set arbitrarily according to the intention of the adjustment. In this case, for example, adjustment is first performed with a large range and width, and then adjustment is performed in a smaller range around the adjustment result. By this means, finer adjustment can be performed easily.

A combination of correction parameters is not limited to a combination of exposure adjustment value and color temperature. Various combination patterns may be used, such as a combination of sharpness indicating the degree of sharpness of an edge image and noise reduction indicating the degree of smoothing of noise included in an image, or a combination of contrast indicating the degree of emphasis of the difference between light and dark in an image and chroma indicating color density, for example. Furthermore, three or more kinds of correction parameters may be chosen at the same time, and temporarily-developed image data having a logical structure of three or more dimensions may be generated.

Information indicating a correction parameter (such as a unique identifier) may be included in temporarily-developed image data instead of a correction parameter. In this case, development server 120 would receive reference information from the development client 110 side as a development instruction, and apply a correction parameter corresponding to the received reference information to development.

(Embodiment 2)

Figure 10:
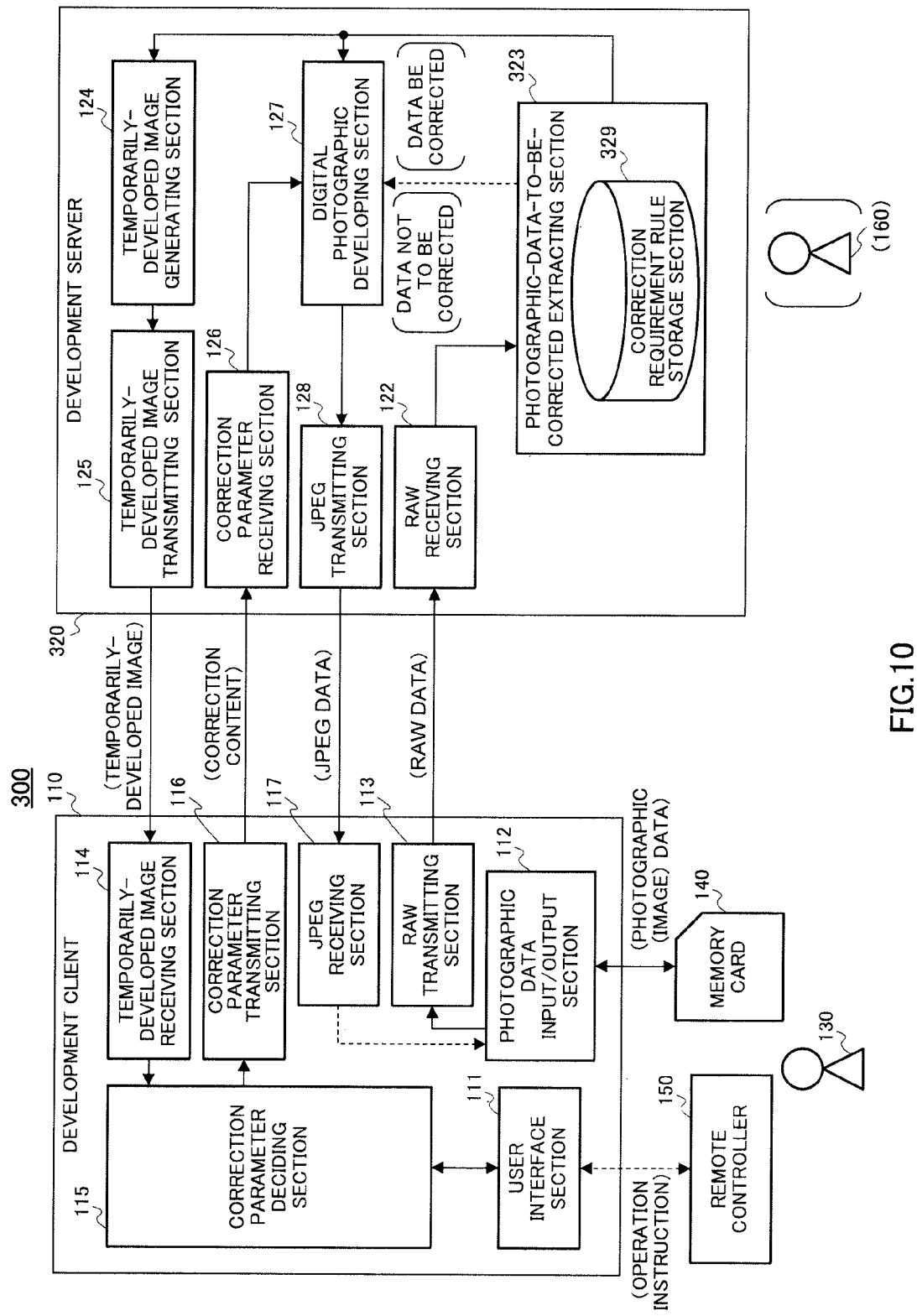
FIG. 10 is a system configuration diagram showing the configuration of a development system according to Embodiment 2 of the present invention.

FIG. 10 is a system configuration diagram showing the configuration of a development system according to Embodiment 2 of the present invention, corresponding to FIG. 2 of Embodiment 1. Parts identical to those in FIG. 2 are assigned the same reference codes as in FIG. 2, and descriptions thereof are omitted here.

In FIG. 10, development system 300 includes development server 320 having a different configuration from development server 120 in FIG. 2. Development server 320 has photographic-data-to-be-corrected extracting section 323 instead of photographic-data-to-be-corrected extracting section 123 and operator interface section 121. Photographic-data-to-be-corrected extracting section 323 has correction requirement rule storage section 329.

Also, in this embodiment, RAW data transmitted from development client 110 to development server 320 conforms to EXIF (exchangeable image file format, registered trademark), an image file standard specification for digital still camera use, and is assumed to have various kinds of imaging information (hereinafter referred to as "EXIF information") accompanying image information added.

FIG. 11 is an explanatory drawing showing an example of the configuration of EXIF information.

As shown in FIG. 11, EXIF information 400 is composed of a plurality of items of information. Of the plurality of items of information composing EXIF information 400, only some, constituting information group 401, are used as correction requirement determination basis. This information group 401 comprises, for example, manufacturer's name, model, imaging date and time, shutter speed, F value, imaging mode, exposure correction value, flash mode, white balance (color temperature), and ISO sensitivity. However, information other than this may also be used as basis for determining whether or not correction is required, depending on correction requirement rule settings described later herein.

Correction requirement rule storage section 329 shown in FIG. 10 stores a correction requirement rule table. In the correction requirement rule table there are entered in advance criteria for determining whether or not RAW data sent from development server 320 is to be corrected.

FIG. 12 is an explanatory drawing showing an example of the configuration of the correction requirement rule table.

As shown in FIG. 12, in correction requirement rule table 430 are entered imaging information stand-alone rules 431, imaging information composite rules 432, and image information rules 433. These rules have rule item 434 and correction requirement rule 435 fields.

Rule item 434 is a field that specifies a type of information used in determination of whether or not correction is required.

In correction requirement rule 435 are entered logical conditional expressions for determining whether or not correction is required from a numeric value provided when items of information specified by rule item 434 are provided as numeric values. Here, the contents of respective logical conditional expressions are illustrated as correction requirement rules 435.

Imaging information stand-alone rules 431 are a group of rules for determining whether or not correction is required based on stand-alone imaging information read from EXIF information 400. Here, imaging information stand-alone rules 431 set correction requirement rules 435 for ISO sensitivity and exposure adjustment value respectively. Imaging information stand-alone rules 431 stipulate a threshold value specific to a camera model as a criterion for determining whether or not correction is required (hereinafter referred to as "correction requirement criterion") as correction requirement rule 435 relating to ISO sensitivity. The correction requirement criterion is stipulated, for example, as ISO 800 or above for a camera of model name a, and ISO 400 or above for a camera of model name b. Also, imaging information stand-alone rules 431 stipulate minus 2 EV or below or plus 2 EV or above as a correction requirement criterion, regardless of the camera model, as correction requirement rule 435 relating to an exposure correction value.

An exposure correction value is a value for intentionally varying the exposure amount for an automatic exposure setting of a camera. Exposure correction values in a range from minus 1 EV to plus 1 EV are generally used. If an exposure correction value is significantly outside this range, it can be assumed that the photographer set the exposure correction value erroneously, or that imaging was performed under conditions in which it was difficult to determine the appropriate exposure amount, such as when a black subject is photographed against a backlight. Therefore, imaging information stand-alone rules 431 have "−2 EV or below or +2 EV or above" entered in rule item 434 "Exposure adjustment value".

Imaging information composite rules 432 are a group of rules for determining whether or not correction is required based on a combination of a plurality of imaging information items read from EXIF information 400. Here, imaging information composite rules 432 set correction requirement rules 435 for various combinations of each of exposure amount, flash, and imaging mode, and white balance.

Imaging information composite rules 432 stipulate a case in which imaging is performed with a setting oriented toward an artificial light source (when white balance is not in a color temperature range of 4500 K to 6000 K), despite the fact that the exposure amount, (13 EV or above) assumes a fine day outdoors, as a correction requirement criterion. Also, imaging information composite rules 432 stipulate a case in which the color temperature is not appropriate for flash (when white balance is not in a color temperature range of 5400 K to 5600 K), despite the fact that flash is used, as a correction requirement criterion. Furthermore, imaging information composite rules 432 stipulate a case in which the color temperature is set in a range appropriate for an artificial light source (when white balance is not in a color temperature range of 4000 K to 7000 K), despite the fact that the imaging mode and shutter speed assume outdoor scenic photography (scenic mode and shutter speed of 1/60 second or above), as a correction requirement criterion.

The unit of exposure amount is EV, and the exposure amount that allows photography at proper brightness using an F1 f-stop value, 1-second shutter speed, and ISO 100, is defined as 0 EV. Normally, the exposure amount increases by 1 EV each time a camera's f-stop value is multiplied by the square root of 2, and increases by 1 EV each time the shutter speed and ISO sensitivity are doubled. The exposure amount for outdoor photography on a fine day is generally said to be around 14 EV.

Image information rules 433 are a group of rules for determining whether or not correction is required based on various information other than EXIF information 400. Here, image information rules 433 set correction requirement rules 435 for underexposure, overexposure, insufficient latitude, and color seepage, as rule items 434.

It is possible, for example, to read the data amounts of bright and dark areas of an image as histogram peaks from histogram information comprising brightness distribution of an entire image. Thus, image information rules 433 define a case in which there is no peak at all in a bright area as underexposure, and conversely, a case in which there is no peak at all in a dark area as overexposure. Then image information rules 433 stipulate these cases as correction requirement criteria. Also, image information rules 433 define a case in which both dark area and bright area peaks are present as insufficient latitude (exceeding a permissible brightness range), and similarly stipulate this case as correction requirement criteria. Furthermore, image information rules 433 define a case in which there are major differences in the shape of histogram peaks for each of R, G, and B (red, green, and blue) as a case in which there is a possibility of color seepage (a color tone abnormality) having occurred, and similarly stipulate this case as correction requirement criteria.

Correction requirement rule table 430 is created by a camera manufacturer based on development results when basic parameters are applied to RAW data obtained under various imaging conditions, for example. Then development server 320 acquires correction requirement rule table 430 created on the manufacturer's side from a server or camera via the Internet, for example. Alternatively, correction requirement rule table 430 may be created by development client 110 user 130, or may be created by development server 320 operator 160.

The operation of photographic-data-to-be-corrected extracting section 323 will now be described in detail.

Photographic-data-to-be-corrected extracting section 323 shown in FIG. 10 executes RAW data classification processing. RAW data classification processing in this embodiment is processing that classifies RAW data as data to be corrected or data not to be corrected based on correction requirement rule table 430.

Figure 13:
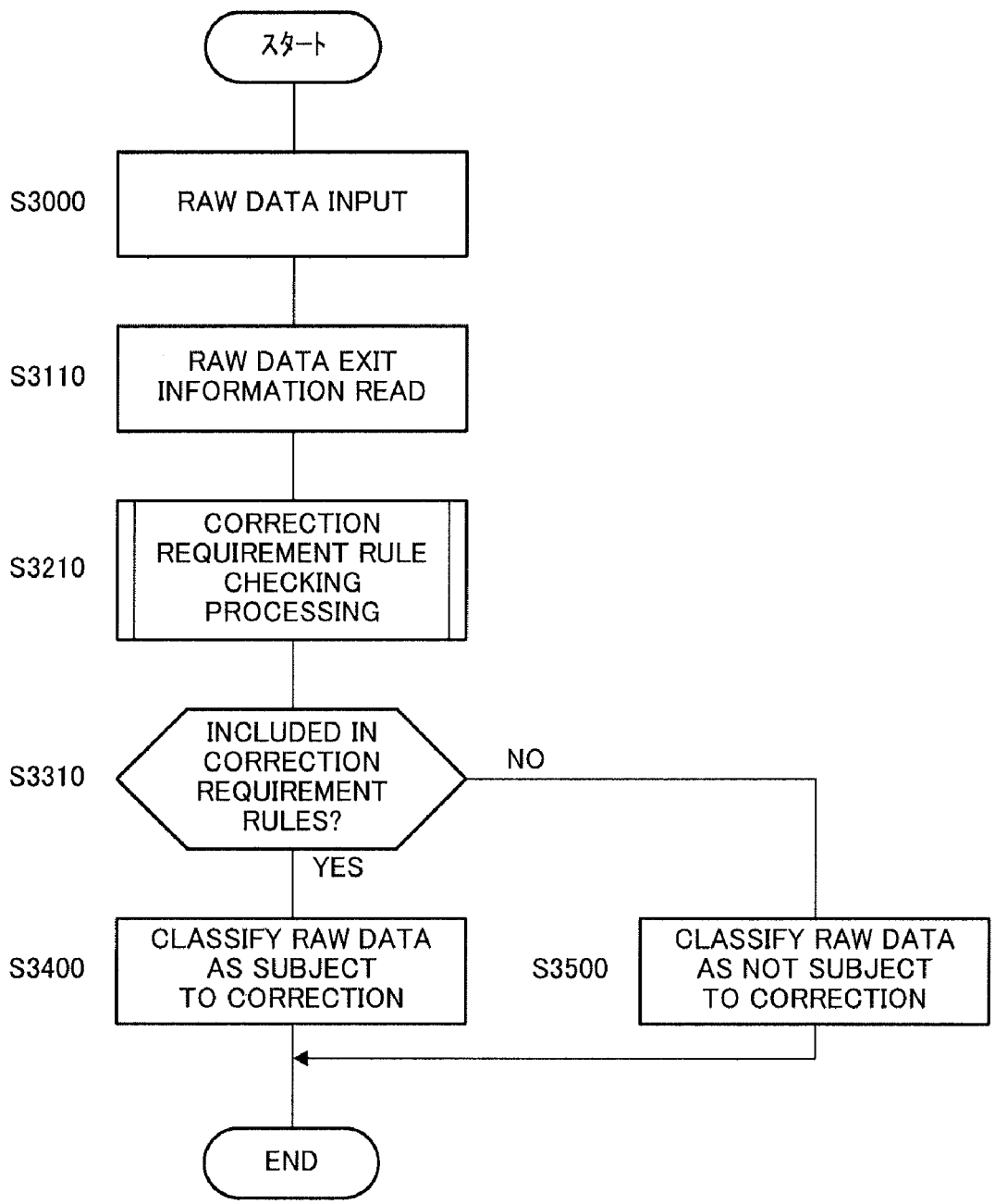
FIG. 13 is a flowchart showing the flow of RAW data classification processing in Embodiment 2.

FIG. 13 is a flowchart showing the flow of RAW data classification processing by photographic-data-to-be-corrected extracting section 323, corresponding to FIG. 4 of Embodiment 1. Parts in FIG. 13 identical to those in FIG. 4 are assigned the same reference codes as in FIG. 4, and descriptions thereof are omitted here.

First, in step S3110, photographic-data-to-be-corrected extracting section 323 reads EXIF information 400 added to RAW data input in step S3000. Here, provision may be made for photographic-data-to-be-corrected extracting section 323 to read, of EXIF information 400, only information (information group 401) entered in rule item 434 of correction requirement rule table 430 shown in FIG. 12.

Actual EXIF data has a complex data structure in which multilevel data structures are nested. Therefore, photographic-data-to-be-corrected extracting section 323 performs EXIF data structure analysis on the RAW data, and performs EXIF information 400 reading. EXIF data structure analysis technology is publicly known, and therefore a detailed description thereof is omitted here.

Next, in step S3210, photographic-data-to-be-corrected extracting section 323 executes correction requirement rule checking processing. Correction requirement rule checking processing is processing that checks read EXIF information 400 against correction requirement rules 435 of correction requirement rule table 430.

Figure 14:
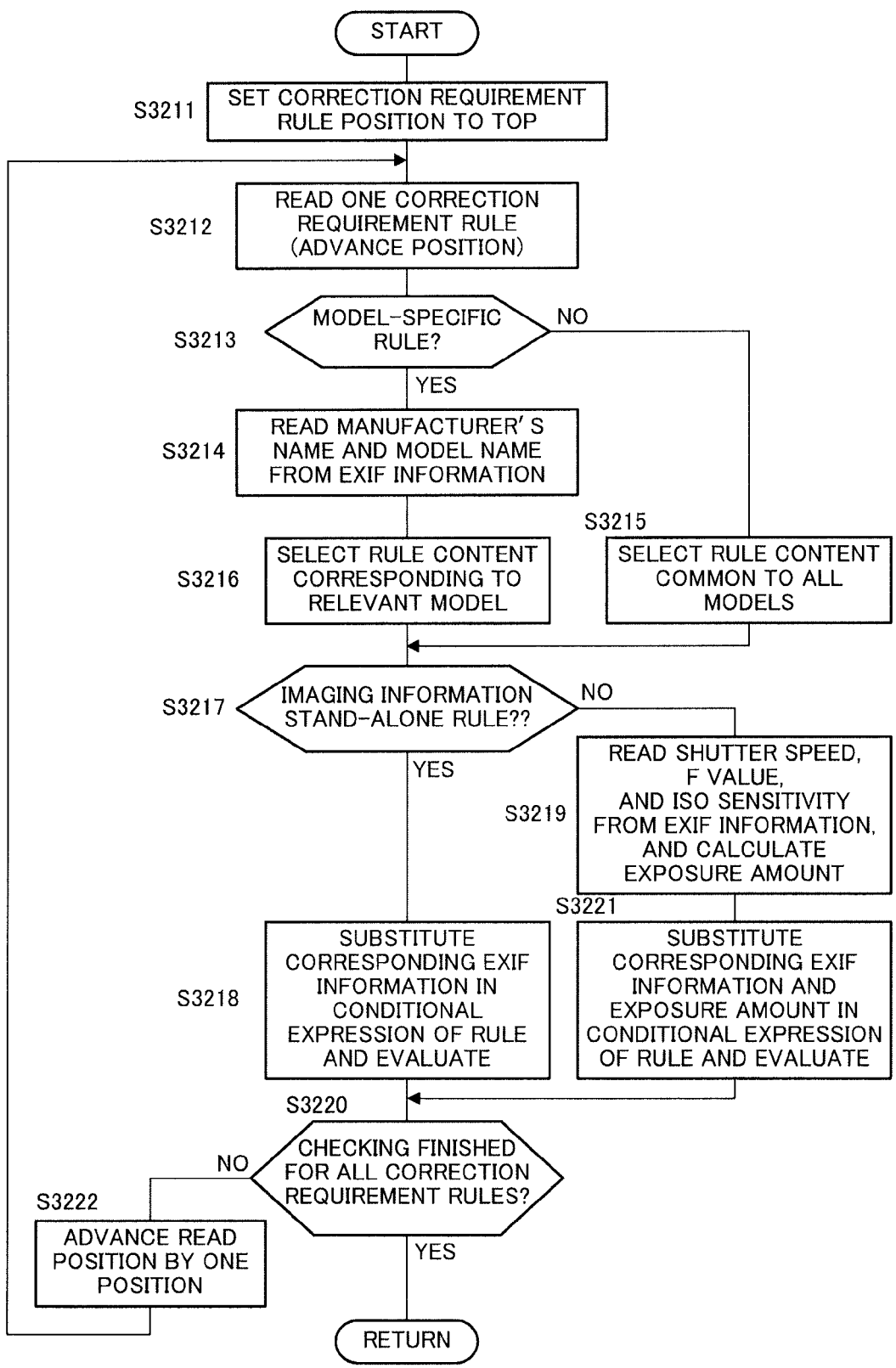
FIG. 14 is a flowchart showing the flow of correction requirement rule checking processing in Embodiment 2.

FIG. 14 is a flowchart showing the flow of correction requirement rule checking processing by photographic-data-to-be-corrected extracting section 323. To simplify the explanation, a case will here be described in which only imaging information stand-alone rules 431 and imaging information composite rules 432 are entered in correction requirement rule table 430 shown in FIG. 12.

First, in step S3211, photographic-data-to-be-corrected extracting section 323, prior to reading information from correction requirement rule table 430, sets the read position to the top of correction requirement rule table 430.

Next, in step S3212, photographic-data-to-be-corrected extracting section 323 reads correction requirement rule 435 at the read position set at that point in time.

Then, in step S3213, photographic-data-to-be-corrected extracting section 323 determines whether or not correction requirement rule 435 that has been read (hereinafter referred to as "rule content") is one provided by camera model (hereinafter referred to as "model-specific rule"). If the rule content is a model-specific rule (S3213: YES), photographic-data-to-be-corrected extracting section 323 proceeds to step S3214. On the other hand, if the rule content is not a model-specific rule—that is, the rule content is common to all models of camera—(S3213: NO), photographic-data-to-be-corrected extracting section 323 proceeds to step S3215.

In step S3214, since the rule content is a model-specific rule, photographic-data-to-be-corrected extracting section 323 reads a manufacturer's name and model name from RAW data EXIF information 400.

Next, in step S3216, photographic-data-to-be-corrected extracting section 323 selects rule content corresponding to the relevant model, and proceeds to step S3217.

On the other hand, in step S3215, since the rule content is common to all models, photographic-data-to-be-corrected extracting section 323 selects rule content common to all models directly, and proceeds to step S3217.

Next, in step S3217, photographic-data-to-be-corrected extracting section 323 determines whether or not read correction requirement rule 435 is stipulated by one kind of imaging information alone—that is, whether or not it is imaging information stand-alone rule 431. If correction requirement rule 435 is imaging information stand-alone rule 431 (S3217: YES), photographic-data-to-be-corrected extracting section 323 proceeds to step S3218. On the other hand, if correction requirement rule 435 is not imaging information stand-alone rule 431—that is, if correction requirement rule 435 is imaging information composite rule 432—(S3217: NO), photographic-data-to-be-corrected extracting section 323 proceeds to step S3219.

In step S3218, photographic-data-to-be-corrected extracting section 323 reads information necessary for computation of a correction requirement rule 435 conditional expression from EXIF information 400, substitutes this in the conditional expression and evaluates whether or not RAW data correction is required, and proceeds to step S3220.

For example, when the camera model is model name a, photographic-data-to-be-corrected extracting section 323 selects correction requirement rule 435 stipulating conditional expression "ISO sensitivity≧800" for rule item 434 "ISO sensitivity". In this case, photographic-data-to-be-corrected extracting section 323 substitutes an ISO sensitivity read from EXIF information 400 in the "ISO sensitivity" part of the conditional expression, and evaluates whether or not the conditional expression holds true. If the conditional expression holds true, photographic-data-to-be-corrected extracting section 323 determines that the RAW data subject to processing is data requiring correction.

Also, with correction requirement rule 435 corresponding to rule item 434 "Exposure correction value", the conditional expression "Exposure correction value <−2 EV or exposure correction value >+2 EV" is stipulated. Therefore, photographic-data-to-be-corrected extracting section 323 substitutes an exposure correction value read from EXIF information 400 in the "exposure correction value" part of the conditional expression, and evaluates whether or not the conditional expression holds true. If the conditional expression holds true, photographic-data-to-be-corrected extracting section 323 determines that the RAW data subject to processing is data requiring correction. Here, "or" is a logical-sum operator.

On the other hand, in step S3219, since photographic-data-to-be-corrected extracting section 323 has not yet acquired all the information necessary for computation of a correction requirement rule 435 conditional expression, it acquires the not yet acquired information. Specifically, photographic-data-to-be-corrected extracting section 323 reads a shutter speed, F value, and ISO sensitivity from EXIF information 400, and calculates an exposure amount.

Next, in step S3221, photographic-data-to-be-corrected extracting section 323, having acquired the information necessary for computation of a correction requirement rule 435 conditional expression, substitutes the corresponding information of the EXIF information in the conditional expression and evaluates whether or not RAW data correction is required, and proceeds to step S3220.

For example, with correction requirement rule 435 corresponding to rule item 434 "Exposure amount & white balance", the conditional expression "exposure amount ≧13 EV and (color temperature<4500 K or color temperature>6000 K)" is stipulated. Therefore, photographic-data-to-be-corrected extracting section 323 substitutes the calculated exposure amount in the "exposure amount" part of the conditional expression, and evaluates whether or not the conditional expression holds true. If the conditional expression holds true, photographic-data-to-be-corrected extracting section 323 determines that the RAW data subject to processing is data requiring correction. Here, "and" is a logical-product operator.

It may be that a color temperature is not included in EXIF information 400, but a name of a white balance specification mode, such as "Fine" or "Cloudy", is included. In a case such as this, a table of color temperatures associated with specification modes should be provided in advance in photographic-data-to-be-corrected extracting section 323 for each camera manufacturer's name and model name. Photographic-data-to-be-corrected extracting section 323 can easily acquire a RAW data color temperature by referencing this table.

Next, in step S3220, photographic-data-to-be-corrected extracting section 323 determines whether or not checking has finished for all correction requirement rules 435 of correction requirement rule table 430. If there is still a correction requirement rule 435 for which checking has yet finished (S3220: NO), photographic-data-to-be-corrected extracting section 323 advances the read position by one position in step S3222, and then returns to step S3212 and performs checking of the next correction requirement rule 435. On the other hand, if checking has finished for all correction requirement rules 435 (S3220: YES), photographic-data-to-be-corrected extracting section 323 terminates the correction requirement rule checking processing and proceeds to step S3310 of the RAW data classification processing shown in FIG. 13.

If photographic-data-to-be-corrected extracting section 323 determines in step S3218 or step S3221 that the RAW data is data requiring correction, it may proceed directly to step S3310 in FIG. 13 without going through step S3220.

Also, whether or not correction is required may be determined from information other than EXIF information 400. For example, a RAW data histogram may be acquired and whether or not correction is required may be determined based on image information rules 433 shown in FIG. 12.

In step S3310 in FIG. 13, photographic-data-to-be-corrected extracting section 323 determines whether or not EXIF information 400 content corresponds to a criterion stipulated by any correction requirement rule 435 of correction requirement rule table 430. That is to say, photographic-data-to-be-corrected extracting section 323 determines whether or not RAW data is included in correction requirement rules 435. If RAW data is included in correction requirement rules 435 (S3310: YES), photographic-data-to-be-corrected extracting section 323 proceeds to step S3400 and classifies that RAW data as data to be corrected. On the other hand, if RAW data is not included in correction requirement rules 435 (S3310: NO), photographic-data-to-be-corrected extracting section 323 proceeds to step S3500 and classifies that RAW data as data not to be corrected.

In this way, data to be corrected (RAW data) is output to temporarily-developed image generating section 124 and a corresponding temporarily-developed image is transmitted to development client 110.

Photographic-data-to-be-corrected extracting section 323 may also use a basis for determining a correction requirement in the correction requirement rule checking processing shown in FIG. 14 as information for performing correction appropriately, and output this to digital photograph developing section 127.

Thus, according to this embodiment, development server 320 references correction requirement rule table 430 in which criteria for determining whether or not correction is required are entered, and determines whether or not RAW data correction is required from information accompanying RAW data. By this means, classification of data to be corrected can be performed automatically, an operator's workload can be reduced, and/or operator's tasks can be rendered unnecessary.

Operator interface section 121 of Embodiment 1 shown in FIG. 2, or an operator interface with degraded functions thereof, may also be provided, and classification results from the above-described RAW data classification processing may be checked by operator 160. For example, development server 320 displays RAW images as choices in an information display screen such as correction requirement input screen 200 shown in FIG. 4, and classification results from RAW data classification processing are indicated by a check mark. Then development server 320 performs final classification after a visual check by operator 160. In this case, data erroneously classified as data not to be corrected in RAW data classification processing, even though it should be corrected, can be made subject to processing. That is to say, the workload of operator 160 can be reduced and accurate data classification can be achieved.

(Embodiment 3)

Figure 15:
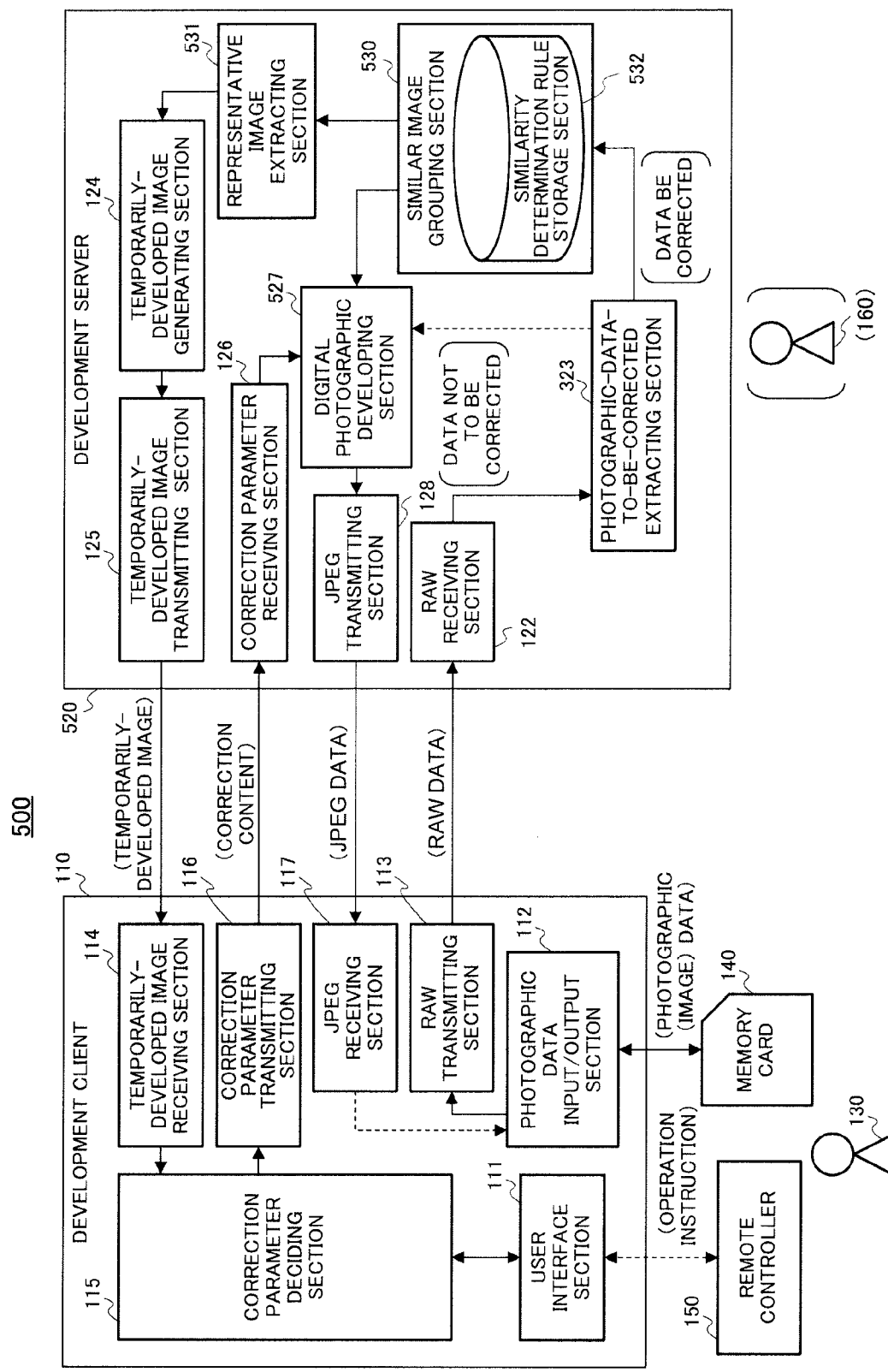
FIG. 15 is a system configuration diagram showing the configuration of a development system according to Embodiment 3 of the present invention.

FIG. 15 is a system configuration diagram showing the configuration of a development system according to Embodiment 3 of the present invention, corresponding to FIG. 2 and FIG. 10 of Embodiment 1 and Embodiment 10. Parts in FIG. 15 identical to those in FIG. 2 and FIG. 10 are assigned the same reference codes as in FIG. 2 and FIG. 10, and descriptions thereof are omitted here.

In FIG. 15, development system 500 includes development server 520 having a different configuration from development server 120 in FIG. 2 and development server 320 in FIG. 10. Development server 520 has digital photograph developing section 527 instead of digital photograph developing section 127, and also newly has similar image grouping section 530 and representative image extracting section 531. Similar image grouping section 530 has similarity determination rule storage section 532.

Similar image grouping section 530 has data to be corrected output from photographic-data-to-be-corrected extracting section 323 as input, collects similar images among the input data to be corrected together into one group, and outputs this group to representative image extracting section 531. Similar images comprise a plurality of data to be corrected that are similar in being able to be developed using the same correction parameters.

Similarity determination rule storage section 532 stores a similarity determination rule table. In the similarity determination rule table, criteria for determining whether or not a plurality of data to be corrected are similar are entered in advance.

FIG. 16 is an explanatory drawing showing an example of the configuration of a similarity determination rule table.

As shown in FIG. 16, similarity determination rule table 600 has rule item 601 and similarity determination rule 602 fields.

Rule items 601 describe types of information used in determination of whether or not a plurality of data to be corrected are similar.

Similarity determination rules 602 describe criteria for determining whether or not a plurality of data to be corrected are similar. Specifically, similarity determination rules 602 describe logical conditional expressions for determining whether or not a plurality of data to be corrected are similar from numeric values provided when items of information specified by rule item 601 are provided as numeric values. Here, the contents of respective logical conditional expressions are illustrated as similarity determination rules 602.

RAW data imaged in similar environments normally have common image quality characteristics. Therefore, when there is a correction parameter for which a development result is obtained that satisfies any of a plurality of such RAW data with similar imaging environments, a generally satisfactory development result can be similarly obtained even if that correction parameter is applied to other RAW data. It is also known that, as a rule of thumb, if the lighting state at the time of imaging and the imaging method are similar, common application of an appropriate correction parameter is possible. Contents focusing on this property are entered in similarity determination rule table 600.

For example, with image data captured at short intervals of several seconds or so, it can be assumed that the same subject was imaged. Therefore, similarity determination rule table 600 contains similarity determination rule 602 "Imaging interval within 10 seconds" corresponding to rule item 601 "Imaging time".

Also, similarity determination rule table 600 contains similarity determination rule 602 "Imaging interval within 1 minute and imaging mode unchanged and flash mode unchanged" corresponding to rule item 601 "Imaging time and imaging mode". This is because a plurality of data to be corrected for which the imaging date and time and imaging mode satisfy above similarity determination rule 602 can be developed using the same correction parameters. The imaging date and time and imaging mode can be acquired from EXIF information added to data to be corrected as described in Embodiment 2.

If images captured at intervals of several minutes are all captured in automatic exposure mode, and the shutter speeds and f-stop values are similar, it can be also assumed that the same subject was captured in these images. Such a case may be entered in similarity determination rule table 600 as a criterion for determining whether or not a plurality of data to be corrected are similar.

Representative image extracting section 531 extracts one representative image on a group-by-group basis from a plurality of data to be corrected, and outputs these images to temporarily-developed image generating section 124 as data to be corrected that is subject to temporarily-developed image creation.

The operation of the above sections will now be described in detail.

Figure 17:
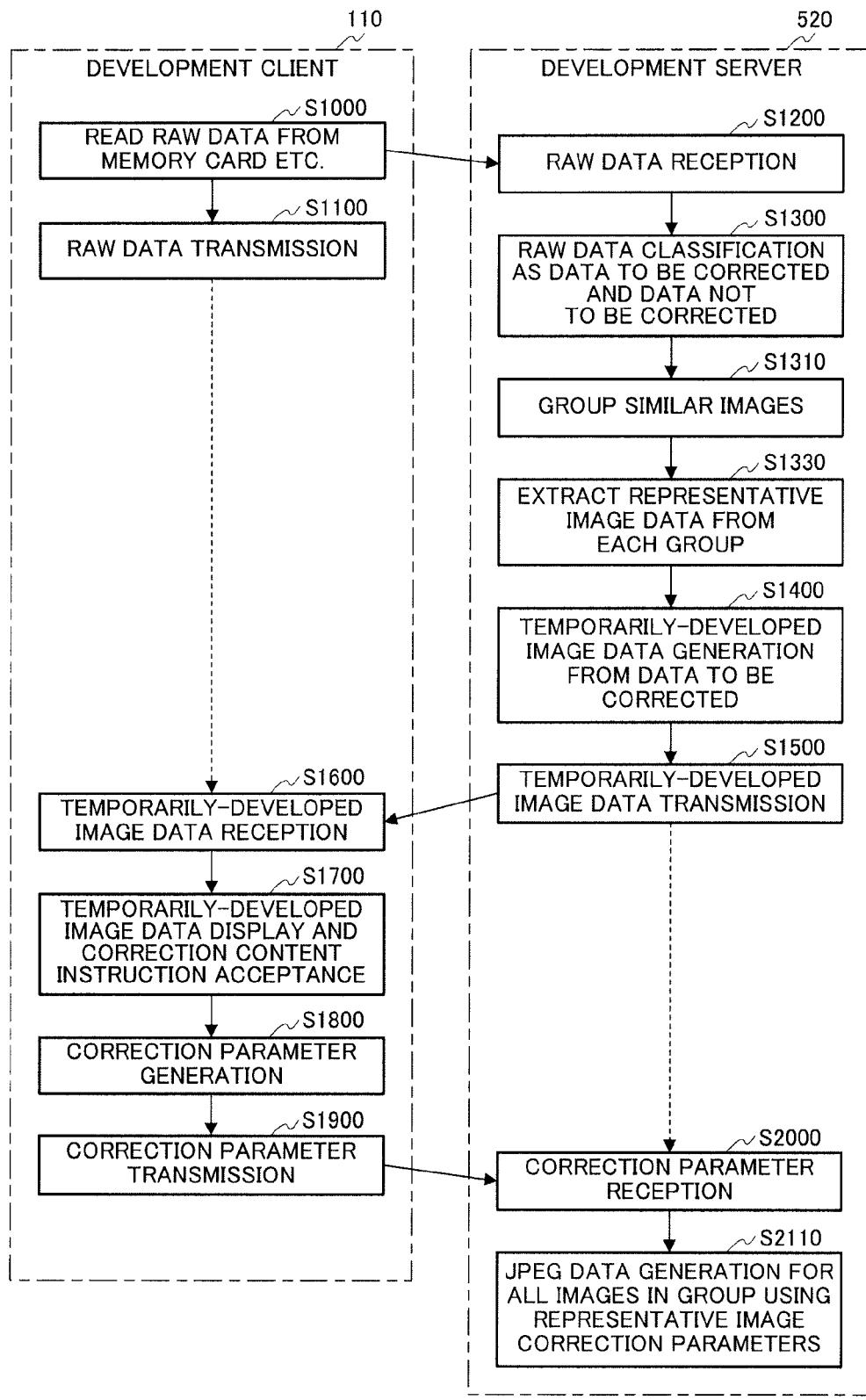
FIG. 17 is a sequence diagram showing the RAW development flow in Embodiment 3.

FIG. 17 is a sequence diagram showing the RAW development flow in Embodiment 3, corresponding to FIG. 3 of Embodiment 1. Parts in FIG. 17 identical to those in FIG. 3 are assigned the same reference codes as in FIG. 3, and descriptions thereof are omitted here.

After RAW data classification has been performed in step S1300, similar image grouping section 530 executes similar image grouping processing in step S1310. Similar image grouping processing is processing that collects similar images together into one group using a similarity determination rule table in similarity determination rule storage section 532.

Figure 18:
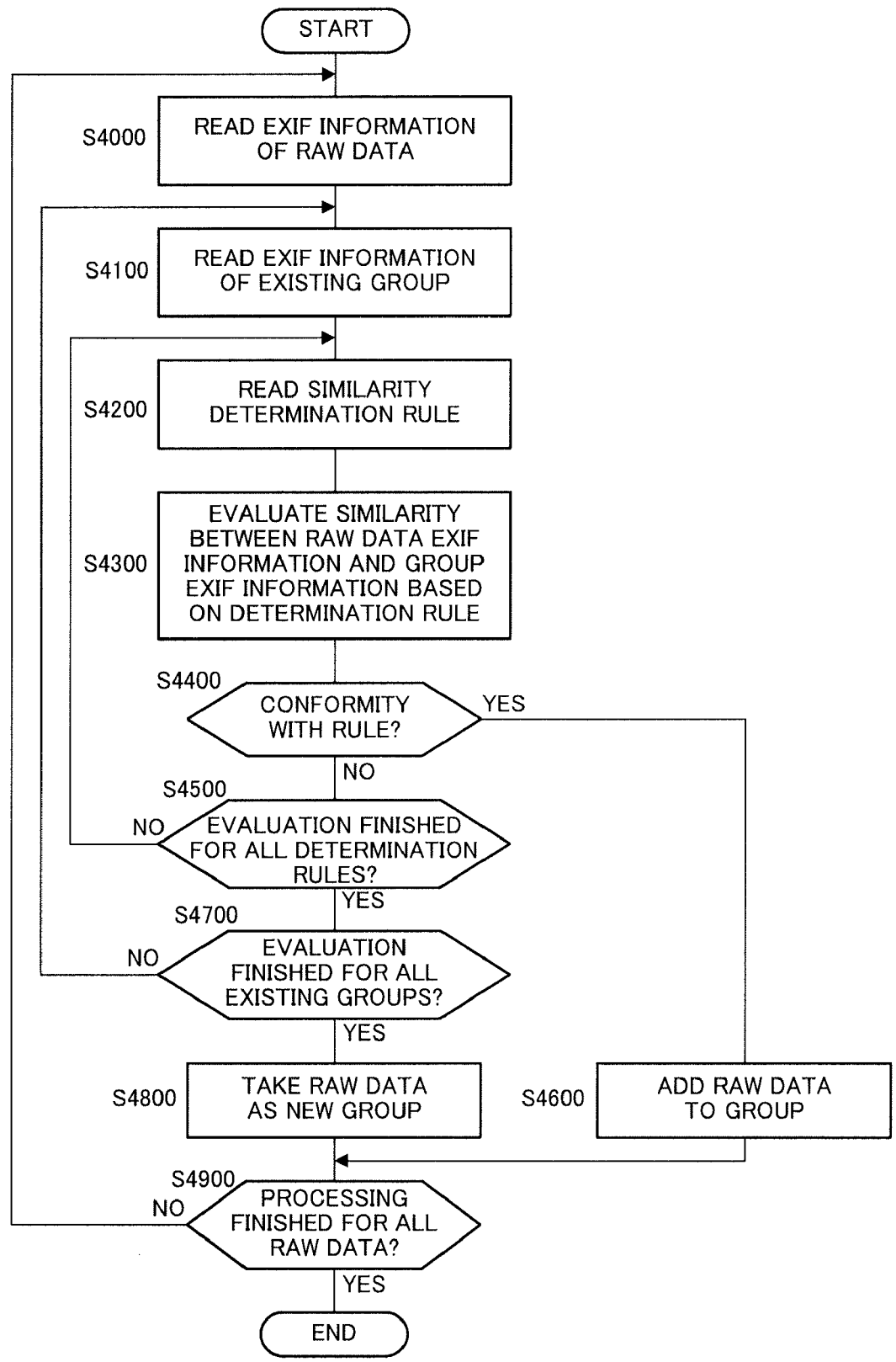
FIG. 18 is a flowchart showing the flow of similar image grouping processing in Embodiment 3.

FIG. 18 is a flowchart showing the flow of similar image grouping processing by similar image grouping section 530.

First, in step S4000, similar image grouping section 530 selects one item of RAW data (data to be corrected) input from photographic-data-to-be-corrected extracting section 323, and reads EXIF information added to the selected RAW data.

Next, in step S4100, similar image grouping section 530 selects one group if it already has groups of RAW data through group generation processing described later herein. Then development client 30 reads EXIF information of RAW data belonging to the selected existing group. Similar image grouping section 530 may read EXIF information of any RAW data belonging to the selected group. Also, similar image grouping section 530 may read EXIF information of a plurality of or all RAW data belonging to the group, and find an EXIF information average value. However, for information relating to the imaging date and time, it is desirable for similar image grouping section 530 to read the information from RAW data captured immediately before.

Then, in step S4200, similar image grouping section 530 selects and reads one similarity determination rule 602 of similarity determination rule table 600.

Next, in step S4300, similar image grouping section 530 evaluates similarity between the selected RAW data and the RAW data of the selected group. Specifically, similar image grouping section 530 evaluates the above similarity based on the content of similarity determination rule 602 selected, using RAW data EXIF information and EXIF information obtained from the selected group.

For example, if similar image grouping section 530 has selected similarity determination rule 602 "Imaging interval within 10 seconds", it compares an imaging date and time read from group EXIF information with an imaging date and time read from the RAW data. Then, if the difference between these two imaging dates and times is within 10 seconds, similar image grouping section 530 determines that they are similar.

However, similar image grouping section 530 may not yet have a RAW data group. In this case, similar image grouping section 530 proceeds directly to the next step without performing similarity evaluation processing.

As an actual means of grouping RAW data, similar image grouping section 530 may, for example, manage individual RAW data grouped with identification information unique to a decided group (hereinafter referred to as "group information"). Also, similar image grouping section 530 may include group information in information accompanying each temporarily-developed image data, and give an instruction for development using group information when correction parameters are specified from the development client 110 side. A widely and generally used publicly known ID (identifier) management technology, for example, can be applied to data grouping and group management by means of such identification information.

Next, in step S4400, similar image grouping section 530 determines whether or not the relationship between the RAW data and the selected group conforms to selected similarity determination rule 602. If the relationship between the RAW data and the group does not conform to similarity determination rule 602 or if similarity evaluation has not been performed (step S4400: NO), similar image grouping section 530 proceeds to step S4500. On the other hand, if the relationship between the RAW data and the group conforms to similarity determination rule 602 (step S4400: YES), similar image grouping section 530 proceeds to step S4600.

In step S4500, similar image grouping section 530 determines whether or not similarity evaluation has been finished for all similarity determination rules 602 of similarity determination rule table 600. If a similarity determination rule 602 for which similarity evaluation has not been used still remains (step S4500: NO), similar image grouping section 530 returns to step S4200, selects unselected similarity determination rule 602, and performs similarity evaluation. On the other hand, if similarity evaluation has been performed for all similarity determination rules 602 (step S4500: YES), similar image grouping section 530 proceeds to step S4700.

In step S4700, similar image grouping section 530 determines whether or not similarity evaluation has been finished for all existing groups. If there is an existing group that has not been made subject to similarity evaluation (step S4700: NO), similar image grouping section 530 returns to step S4700, selects the unselected group, and performs similarity evaluation. On the other hand, if similarity evaluation has been performed for all existing groups (step S4700: YES), similar image grouping section 530 proceeds to step S4800.

In step S4800, similar image grouping section 530 determines that the RAW data is not similar to any existing group, generates a new group, and places the RAW data in the generated new group, and proceeds to step S4900.

On the other hand, in step S4600, since an existing group that conforms to similarity determination rule 602—that is, a similar group—exists, similar image grouping section 530 adds the RAW data to that existing group, and proceeds to step S4900.

In step S4900, similar image grouping section 530 determines whether or not grouping has finished for all RAW data input from photographic-data-to-be-corrected extracting section 323. If there remains RAW data input from photographic-data-to-be-corrected extracting section 323 for which grouping has not yet been performed (step S4900: NO), similar image grouping section 530 returns to step S4000, selects unselected RAW data, and performs grouping. On the other hand, if grouping has been finished for all RAW data input from photographic-data-to-be-corrected extracting section 323 (step S4900: YES), similar image grouping section 530 terminates the series of processing steps.

In this way, similar image grouping section 530 groups data not to be corrected among RAW data sent as a mass from development client 110 as data to which the same correction parameters can be applied. Then development server 520 adds corresponding group information to grouped RAW data and outputs the data to representative image extracting section 531, and processing proceeds to step S1330 in FIG. 17.

In step S1330 in FIG. 17, representative image extracting section 531 extracts representative image data of each group by selecting one item of RAW data from each group, and adds corresponding group information to the respective extracted representative image data. Then representative image extracting section 531 outputs representative image data to which group information has been added to temporarily-developed image generating section 124. Selection of representative image data in each group may be random, or a RAW image having EXIF information that is average within a group may be selected.

The processing in step S1400 through step S2000 is similar to the processing illustrated in FIG. 3. In step S2000, development server 520 receives correction parameters selected by user 130.

However, what is subject to temporarily-developed image data generation in step S1400 is only data to be corrected extracted by representative image extracting section 531 from among data to be corrected classified by photographic-data-to-be-corrected extracting section 323. Also, the number of data to be corrected extracted by representative image extracting section 531 is equal to the number of groups of group division by data to be corrected. Therefore, the number of temporarily-developed images transmitted in step S1500 and the number of correction parameters transmitted in step S2000 are kept lower than in a case in which representative image data is not extracted.

In step S2110, digital photograph developing section 527, in the same way as digital photograph developing section 127 in FIG. 2, performs development processing of data to be corrected by applying correction parameters input from correction parameter receiving section 126. However, correction parameters are specified as associated with only representative image data. Therefore, digital photograph developing section 527 applies correction parameters specified for representative image data to all image data (RAW data) within the same group, and generates JPEG data. Also, development server 520 associates a temporarily-developed image or RAW data constituting the basis of a temporarily-developed image with group information, and manages correction parameters and group information as a set. By this means, identification of which correction parameter corresponds to which group can be performed easily.

Thus, according to this embodiment, development server 520 groups a plurality of data to be corrected that can use the same correction parameters. Then development server 520 takes only representative image data as subject to temporarily-developed image generation. Furthermore, development server 520 applies correction parameters specified for each temporarily-developed image to all data to be corrected within the same group. By this means, development server 520 can reduce the size of temporarily-developed image data and the number of correction parameters transmitted/received to/from development client 110. Also, by this means, development system 500 can reduce the number of temporarily-developed images shown as choices by development client 110 to a minimum, and user 130 can obtain a desired development result with a minimum of correction operations. That is to say, the load on user 130 can be further reduced. Also, development system 500 can impart consistency to development results, and in particular, can effectively suppress a deficiency of color tone consistency among a plurality of images due to white balance variance. Furthermore, development system 500 can reduce the development client 110 and development server 520 apparatus loads, and the network load.

Development server 520 may also perform determination of which group generated by similar image grouping section 530 data not to be corrected belongs to, and perform development using the same correction parameters for the relevant group. In this case, however, it is desirable for development server 520 to select representative image data from among data to be corrected so that user 130 can easily recognize the effects of correction.

Development server 520 may also be provided with operator interface section 121 of Embodiment 1 shown in FIG. 2, or an operator interface with degraded functions thereof, and RAW data grouping resulting from the above-described similar image grouping processing may be checked by operator 160. For example, development server 520 displays RAW images as choices and also displays the results of group divisions by the above-described similar image grouping processing in an information display screen such as correction requirement input screen 200 shown in FIG. 4, and accepts changes by means of operator 160 operations. In this case, if incorrect grouping has been performed by the similar image grouping processing, for example, this can be corrected. That is to say, the workload of operator 160 can be reduced and accurate data classification can be achieved.

(Embodiment 4)

Figure 19:
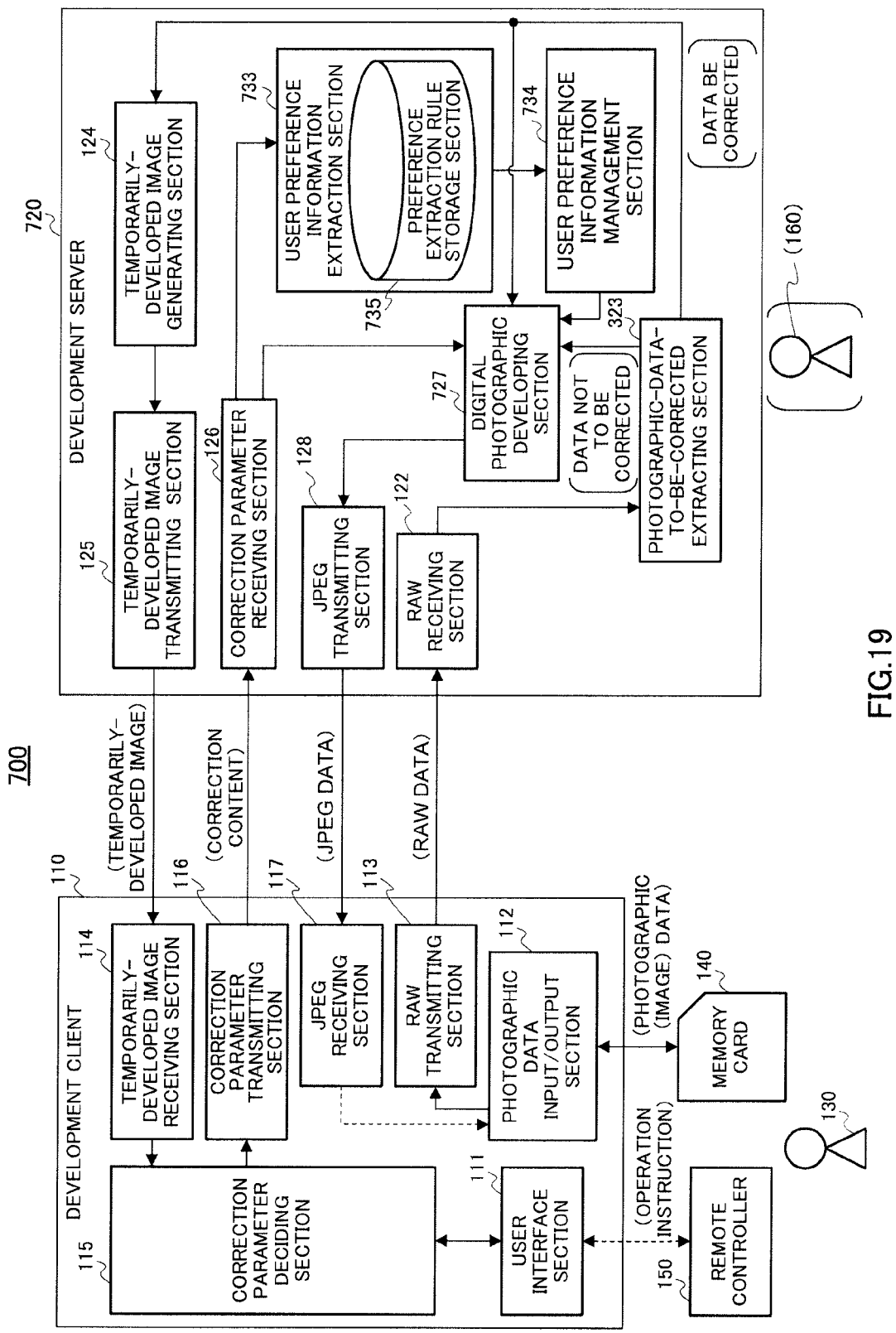
FIG. 19 is a system configuration diagram showing the configuration of a development system according to Embodiment 4 of the present invention.

FIG. 19 is a system configuration diagram showing the configuration of a development system according to Embodiment 4 of the present invention, corresponding to FIG. 2, FIG. 10, and FIG. 15 of Embodiment 1 through Embodiment 3. Parts in FIG. 19 identical to those in FIG. 2, FIG. 10, and FIG. 15 are assigned the same reference codes as in FIG. 2, FIG. 10, and FIG. 15, and descriptions thereof are omitted here.

In FIG. 19, development system 700 includes development server 720 having a different configuration from development servers 120, 320, and 520 in FIG. 2, FIG. 10, and FIG. 15. Development server 720 has digital photograph developing section 727 instead of digital photograph developing section 127 or 527, and also newly has user preference information extracting section 733 and user preference information management section 734. User preference information extracting section 733 has preference extraction rule storage section 735.

User preference information extracting section 733 has correction parameters output from correction parameter receiving section 126 as input, extracts user preference information from the correction parameters, and outputs this to user preference information management section 734. User preference information is information indicating a general image quality tendency preferred by user 130.

Preference extraction rule storage section 735 stores a preference extraction rule table. In the preference extraction rule table, preference extraction rules serving as criteria when extracting user preference information from correction parameters are entered in advance.

FIG. 20 is an explanatory drawing showing an example of the configuration of a preference extraction rule table.

As shown in FIG. 20, preference extraction rule table 800 has extraction condition 801, extraction object 802, and extraction result 803 fields.

Extraction conditions 801 describe conditions under which user preference information can be extracted. Here, extraction conditions 801 describe conditions relating to RAW data EXIF information.

Extraction objects 802 specify information read from correction parameters when extraction condition 801 holds true.

Extraction results 803 specify content extracted as user preference information.

For example, when flash is used, a camera normally automatically sets a color temperature based on the color of flash light. Correction content for such an automatically set color temperature often reflects a difference between color information held by the camera and the user's preference rather than white balance variance, and has high utility value as user preference information. Therefore, as shown in FIG. 20, preference extraction rule table 800 contains extraction object 802 "Color temperature" and extraction result 803 "Difference between default color temperature when using flash and correction parameter color temperature" associated with extraction condition 801 "Flash use". This is a preference extraction rule when the difference between a color temperature set automatically by a camera and a color temperature included in correction parameters is treated as user preference information.

Also, if the exposure amount indicates 14 EV or above, this indicates that imaging was performed in an extremely bright environment, and outdoor photography in fine weather can be assumed. In this case, a color temperature appropriate for sunlight is normally set automatically. Correction content for such an automatically set color temperature often reflects a user's preference. Therefore, as shown in FIG. 20, preference extraction rule table 800 contains extraction object 802 "Color temperature" and extraction result 803 "Difference between fine-weather color temperature when exposure amount is 14 EV or above and correction parameter color temperature" associated with extraction condition 801 "Exposure amount is 14 EV".

Furthermore, preference extraction rule table 800 specifies a noise reduction amount included in correction parameters as extractable user preference information associated with ISO sensitivity. For example, preference extraction rule table 800 contains extraction object 802 "Noise reduction amount" and extraction result 803 "Noise reduction amount for ISO 100 or below" associated with extraction condition 801 "ISO sensitivity of 100 or below". This is a preference extraction rule specifying that a noise reduction amount read from a correction parameter is to be extracted as "User-preferred noise reduction amount for ISO 100 or below" when ISO sensitivity that is information included in EXIF information is 100 or below.

User preference information management section 734 in FIG. 19 has a storage area for storing information (not shown), holds user preference information input from user preference information extracting section 733, and manages held user preference information (a user profile).

Digital photograph developing section 727 performs development for data to be corrected using correction parameters sent from development client 110, and also performs development for data not to be corrected using information held by user preference information management section 734.

The operation of the above sections will now be described in detail.

Figure 21:
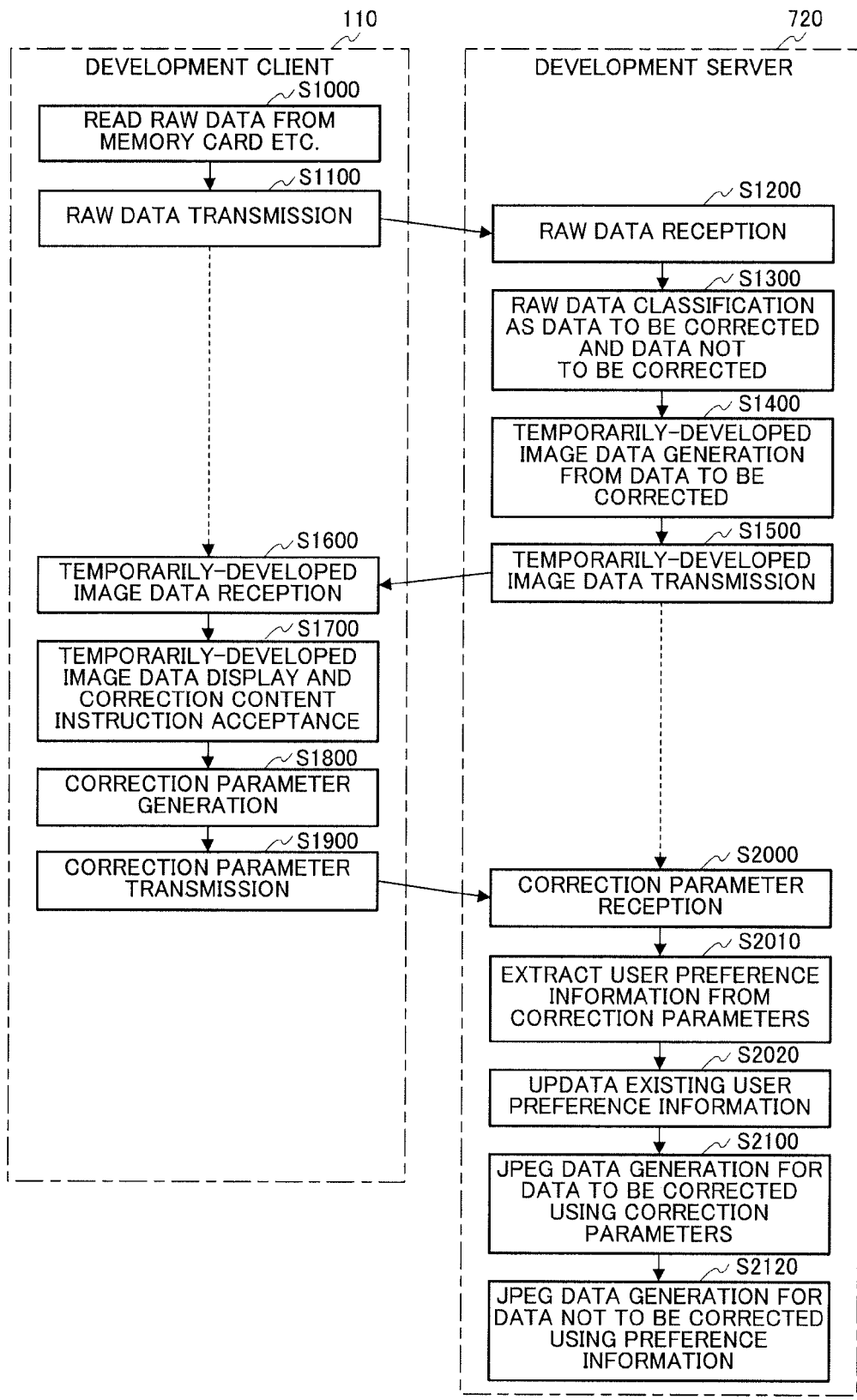
FIG. 21 is a sequence diagram showing the RAW development flow in Embodiment 4.

FIG. 21 is a sequence diagram showing the RAW development flow in Embodiment 4, corresponding to FIG. 3 of Embodiment 1. Parts in FIG. 21 identical to those in FIG. 3 are assigned the same reference codes as in FIG. 3, and descriptions thereof are omitted here.

The processing in step S1000 through step S2000 is similar to that in Embodiment 1. However, in step S2000, correction parameter receiving section 126 outputs received correction parameters not only to digital photograph developing section 727 but also to user preference information extracting section 733.

Following the step S2000 processing, in step S2010 user preference information extracting section 733 executes user preference information extraction processing. User preference information extraction processing is processing that extracts user preference information from correction parameters using preference extraction rule table 800.

Figure 22:
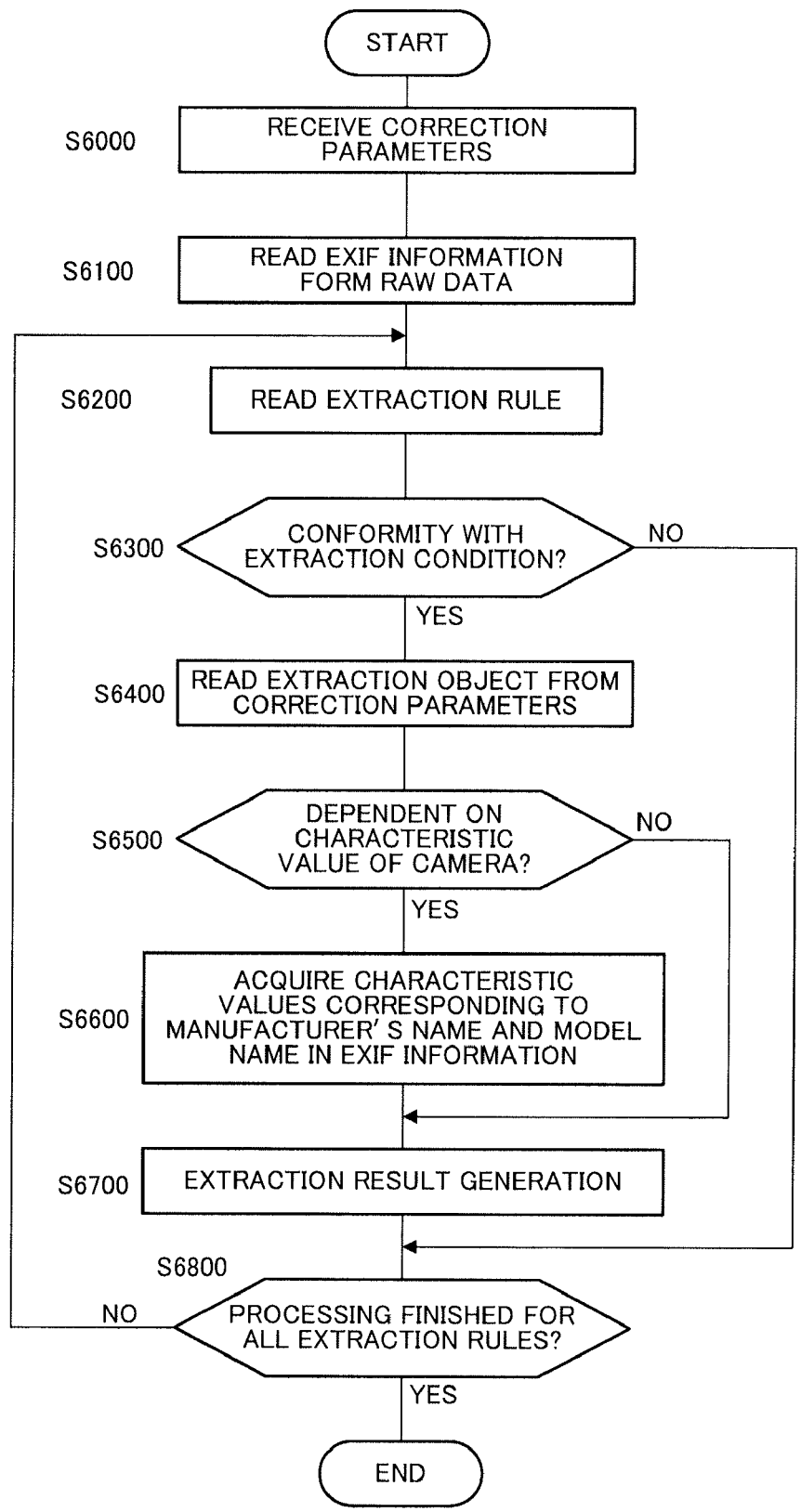
FIG. 22 is a flowchart showing the flow of user preference information extraction processing in Embodiment 4.

FIG. 22 is a flowchart showing the flow of user preference information extraction processing by user preference information extracting section 733.

First, in step S6000, user preference information extracting section 733 has correction parameters specified by user 130 as input from correction parameter receiving section 126.

Next, in step S6100, user preference information extracting section 733 reads EXIF information added to RAW data (data to be corrected) subject to development using correction parameters.

Then, in step S6200, user preference information extracting section 733 selects one preference extraction rule from preference extraction rule table 800, and reads extraction condition 801, extraction object 802, and extraction result 803 of the selected preference extraction rule.

Next, in step S6300, user preference information extracting section 733 checks EXIF information against the read extraction condition 801, and determines whether or not EXIF information conforms to extraction condition 801. If EXIF information conforms to extraction condition 801 (S6300: YES), user preference information extracting section 733 proceeds to step S6400.

In step S6400, user preference information extracting section 733 reads an object specified by read extraction object 802 from the correction parameters.

Then, in step S6500, user preference information extracting section 733 determines whether or not read extraction result 803 depends on a characteristic value of the camera. If extraction result 803 depends on a characteristic value of the camera (S6500: YES), user preference information extracting section 733 proceeds to step S6600. On the other hand, if extraction result 803 does not depend on a characteristic value of the camera (S6500: NO), user preference information extracting section 733 proceeds to step S6700 without going through step S6600. Characteristic values of a camera include, for example, a default color temperature for flash use held originally by the camera.

In step S6600, user preference information extracting section 733 references a correspondence table held in advance and acquires the camera's characteristic values. This correspondence table contains in advance respective camera characteristic values associated with a manufacturer's name and model name. User preference information extracting section 733 acquires the manufacturer's name and model name of a camera that imaged the RAW data from the EXIF information, and acquires characteristic values by referencing the correspondence table.

Next, in step S6700, user preference information extracting section 733 generates an extraction result in accordance with the content of read extraction result 803, and proceeds to step S6800.

For example, if extraction condition 801 extracted in step S6200 is "Flash use", and "Flash mode: used" is included in the RAW data EXIF information, user preference information extracting section 733 acquires a color temperature from the EXIF information since there is conformity with extraction condition 801. Also, since extraction result 803 depends on a characteristic value of the camera, namely the default color temperature when flash is used, user preference information extracting section 733 acquires a manufacturer's name and model name from the EXIF information, and generates an extraction result using the correspondence table.

On the other hand, if, in step S6300, the result of checking EXIF information against read extraction condition 801 is that there is no conformity with extraction condition 801 (S6300: NO), user preference information extracting section 733 proceeds directly to step S6800 without going through steps S6400 through S6700.

Then, in step S6800, user preference information extracting section 733 determines, for all the preference extraction rules in preference extraction rule table 800, whether or not user preference information extraction is possible, and whether or not user preference information extraction processing has been finished. If preference extraction rules that have not been subject to processing still remain (S6800: NO), user preference information extracting section 733 returns to step S6200, selects an unselected preference extraction rule, and performs user preference information extraction possibility/non-possibility determination. On the other hand, if processing has finished for all the preference extraction rules (S6800: YES), user preference information extracting section 733 terminates the series of processing steps.

In this way, user preference information extracting section 733 extracts user preference information from corrected data sent from development client 110. Then user preference information extracting section 733 outputs extracted user preference information to user preference information management section 734, and proceeds to step S2020 in FIG. 21.

In step S2020 in FIG. 21, user preference information management section 734 holds input user preference information in a storage area, and if user preference information is already being held for the same user, updates that existing user preference information with the newly input user preference information.

As a means of updating user preference information, user preference information management section 734 may, for example, overwrite existing user preference information directly with new user preference information. Alternatively, user preference information management section 734 may learn a user's preference or preference tendency over an extended period using a publicly known learning technology, such as means of multiplying existing information by a new preference information weighted with constant value, for example. Also, user preference information management section 734 may perform association between user preference information and user 130 for each data transmission/reception destination/source based on operations performed by respective fixed users 130 for each development client 110. Furthermore, user preference information management section 734 may perform user authentication prior to development processing, and perform association between user preference information and user 130 for each user 130.

Next, in step S2100, digital photograph developing section 727 develops data to be corrected, using correction parameters sent from development client 110, and generates JPEG data.

Furthermore, in step S2120, digital photograph developing section 727 also develops data not to be corrected, using user preference information held by user preference information management section 734, and generates JPEG data.

Specifically, digital photograph developing section 727 makes an inquiry to user preference information management section 734 concerning user preference information for a transmission source of data not to be corrected. Then, if relevant user information is already being held in user preference information management section 734, digital photograph developing section 727 acquires this. Digital photograph developing section 727 then generates correction parameters corresponding to the acquired user preference information, and performs development of the data not to be corrected using the generated correction parameters.

Assume, for example, that user 130 has specified a color temperature correction in the past for RAW data captured using flash. In this case, user preference information management section 734 will be holding a difference between a default color temperature when flash is used and a correction parameter color temperature as user preference information. At this time, digital photograph developing section 727 performs development using user preference information for data to be corrected transmitted from user 130 and captured by using flash. That is to say, digital photograph developing section 727 performs development using a correction parameter obtained by adding the above color temperature difference to the default color temperature when flash is used.

Also, assume, for example, that user 130 has specified a color temperature correction in the past for RAW data captured with an exposure amount of 14 EV or above. In this case, user preference information management section 734 will be holding a difference between a fine-weather color temperature when the exposure amount is 14 EV or above and a correction parameter color temperature as user preference information. At this time, digital photograph developing section 727 performs development using user preference information for data to be corrected transmitted from user 130 and captured with an exposure amount of 14 EV or above. That is to say, digital photograph developing section 727 performs development using a correction parameter obtained by adding the above color temperature difference to the fine-weather color temperature when the exposure amount is 14 EV or above.

Thus, according to this embodiment, development server 720 extracts user preference information relating to image quality correction by user 130 from correction parameters specified by user 130 for data to be corrected, and performs development of data to be corrected using the extracted user preference information. By this means, an image having an image quality conforming to a user's preference can be obtained not only for data to be corrected but also for data not to be corrected, without imposing additional work on user 130.

(Embodiment 5)

Figure 23:
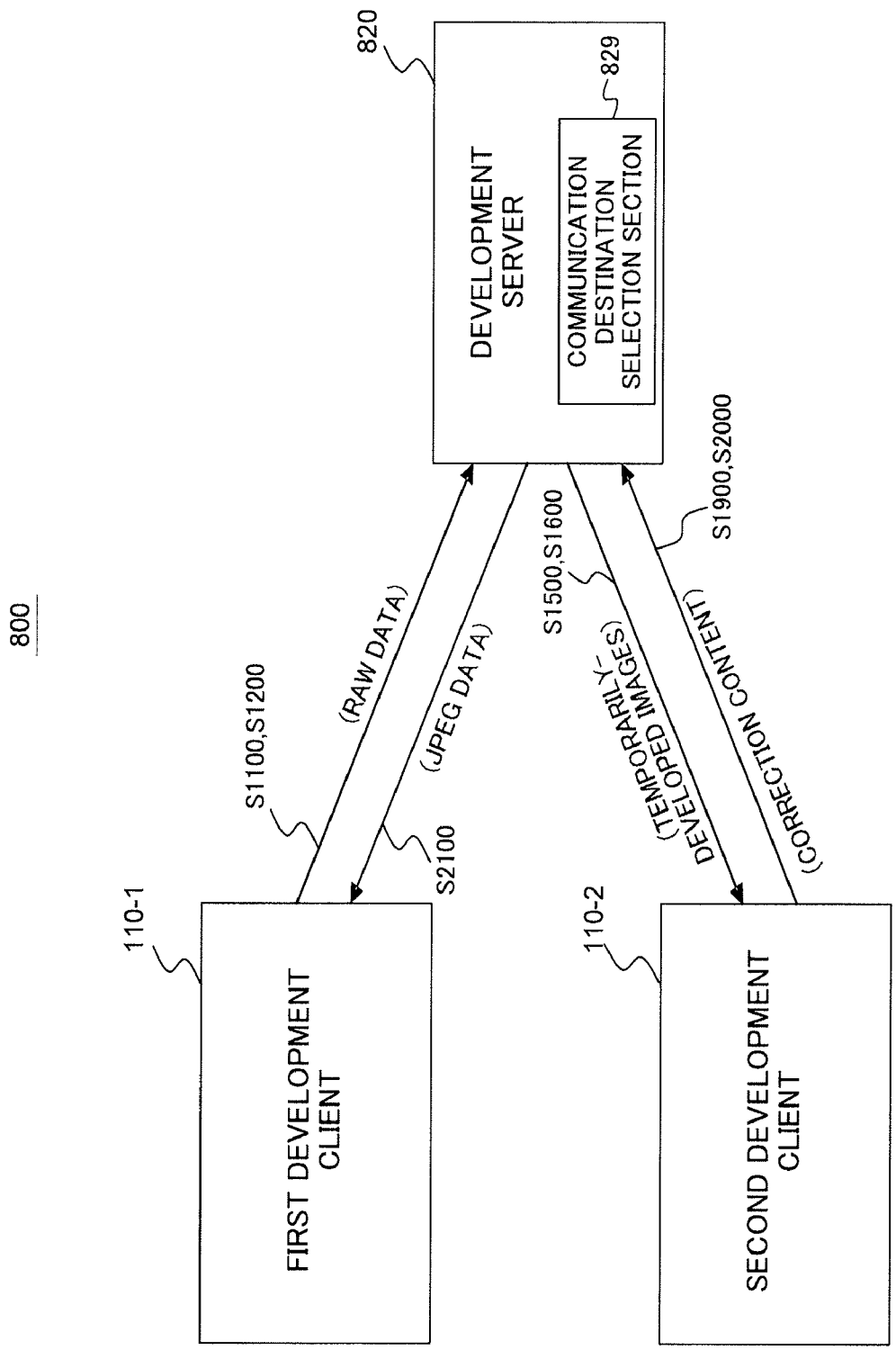
FIG. 23 is a system configuration diagram showing the configuration of a development system according to Embodiment 5 of the present invention.

FIG. 23 is a system configuration diagram showing the configuration of a development system according to Embodiment 5 of the present invention, corresponding to FIG. 2 of Embodiment 1. Parts in FIG. 23 identical to those in FIG. 2 are assigned the same reference codes as in FIG. 2, and descriptions thereof are omitted here.

In FIG. 23, development system 800 includes first and second development clients 110-1 and 110-2 having the same configuration as development client 110 in FIG. 2, and development server 820 having a different configuration from development server 120 in FIG. 2. Development server 820 has communication destination selection section 829 in addition to the configuration shown in FIG. 2.

Communication destination selection section 829 of development server 820 controls communication for temporarily-developed image transmitting section 125 shown in FIG. 2, and transmits temporarily-developed images generated from RAW data to a communicating-party other than the transmission source of that RAW data. Communication destination selection section 829 controls JPEG transmitting section 128 shown in FIG. 2, and transmits JPEG data generated based on correction content not to the correction content transmission source but to the RAW data transmission source. Communication destination selection section 829, for example, stores in advance a table (not shown) in which RAW data transmission sources are associated with communicating-parties to which temporarily-developed images should be transmitted. Each time RAW data is received, communication destination selection section 829 references this table and transmits temporarily-developed images to the communicating-party corresponding to the RAW data transmission source.

An IP (internet protocol) address or the like widely used on the Internet may be used, for example, as a method of deciding arbitrarily upon a temporarily-developed image transmission source. A technology for implementing this will be known to those skilled in the art, and therefore a description thereof is omitted here.

An example of data flow in development system 800 will now be described. Here, a case will be described in which second development client 110-2 is entered in a table stored in communication destination selection section 829 as a temporarily-developed image transmission destination when RAW data is received from first development client 110-1. Step numbers in FIG. 23 correspond to step numbers in FIG. 3 of Embodiment 1.

As shown in FIG. 23, first, RAW data is transmitted from first development client 110-1 to development server 820 (S1100, S1200).

Next, development server 820 generates temporarily-developed images from RAW data classified as data to be corrected from among the received RAW data. Then communication destination selection section 829 in development server 820 selects not first development client 110-1 but second development client 110-2 as the transmission destination of the generated temporarily-developed images. As a result, temporarily-developed image data including temporarily-developed images is transmitted from development server 820 to second development client 110-2 (S1500, S1600).

On the first development client 110-1 side, transmission of temporarily-developed images generated from RAW data transmitted by that apparatus to another development client 110 may be restricted. Restriction of temporarily-developed image transmission can be implemented, for example, by having development server 820 perform authentication of a temporarily-developed image transmission destination using a password set by first development client 110-1. Technology for authentication processing using a password and restriction of processing thereby will be known to those skilled in the art, and therefore a description thereof is omitted here.

Next, a correction parameter indicating correction content for a temporarily-developed image selected by the user from among received temporarily-developed images is transmitted to development server 820 by second development client 110-2 (S1900, S2000).

Then development server 820 generates JPEG data based on the received correction content, and transmits the generated JPEG data not to second development client 110-2 but to first development client 110-1, which is the RAW data transmission source (S2100). Provision may also be made for JPEG data to be transmitted to second development client 110-2.

Thus, according to this embodiment, a user of a development client different from a development client that transmits RAW data can decide upon correction content while viewing temporarily-developed images, and decide upon an image quality of JPEG data that is developed. That is to say, development system 800 of this embodiment makes it possible for another user to decide, by proxy, upon a correction parameter that is applied to RAW data. By this means, when there are, for example, "a user who is good at taking photographs but poor at deciding upon JPEG data image quality" and "a user who has no opportunity to take photographs but is good at deciding upon JPEG data image quality", a good digital photograph can easily be created as a collaborative work through cooperation between these users. This is particularly useful when users are at geographically separate locations and have a mutual understanding regarding proxy decisions about JPEG data image quality.

Also, in development system 800 of this embodiment the same user has a plurality of development clients, making it possible to respond to a request for RAW data acquisition and temporarily-developed image selection to be performed by different development clients. For example, there may be a case in which acquired RAW data is transmitted from a camera to development server 820, and temporarily-developed image selection is performed by means of a personal computer equipped with a high-image-quality display. Thus, this embodiment makes it possible to cope more flexibly in the event of complex and varied user requests for RAW data development modes.

The number of development clients subject to communication destination selection by development server 820 is not limited to two. If three or more development clients are made subject to communication destination selection by development server 820, it is possible, for example, for different correction content to be decided by development client 110 on an individual RAW data basis, or for correction content to be decided by a plurality of development clients 110 from one item of RAW data, and a plurality of developed JPEG data to be obtained. That is to say, RAW data development modes can be made more complex and varied, and it is possible, for example, to further extend the scope of digital image creation.

(Embodiment 6)

Figure 24:
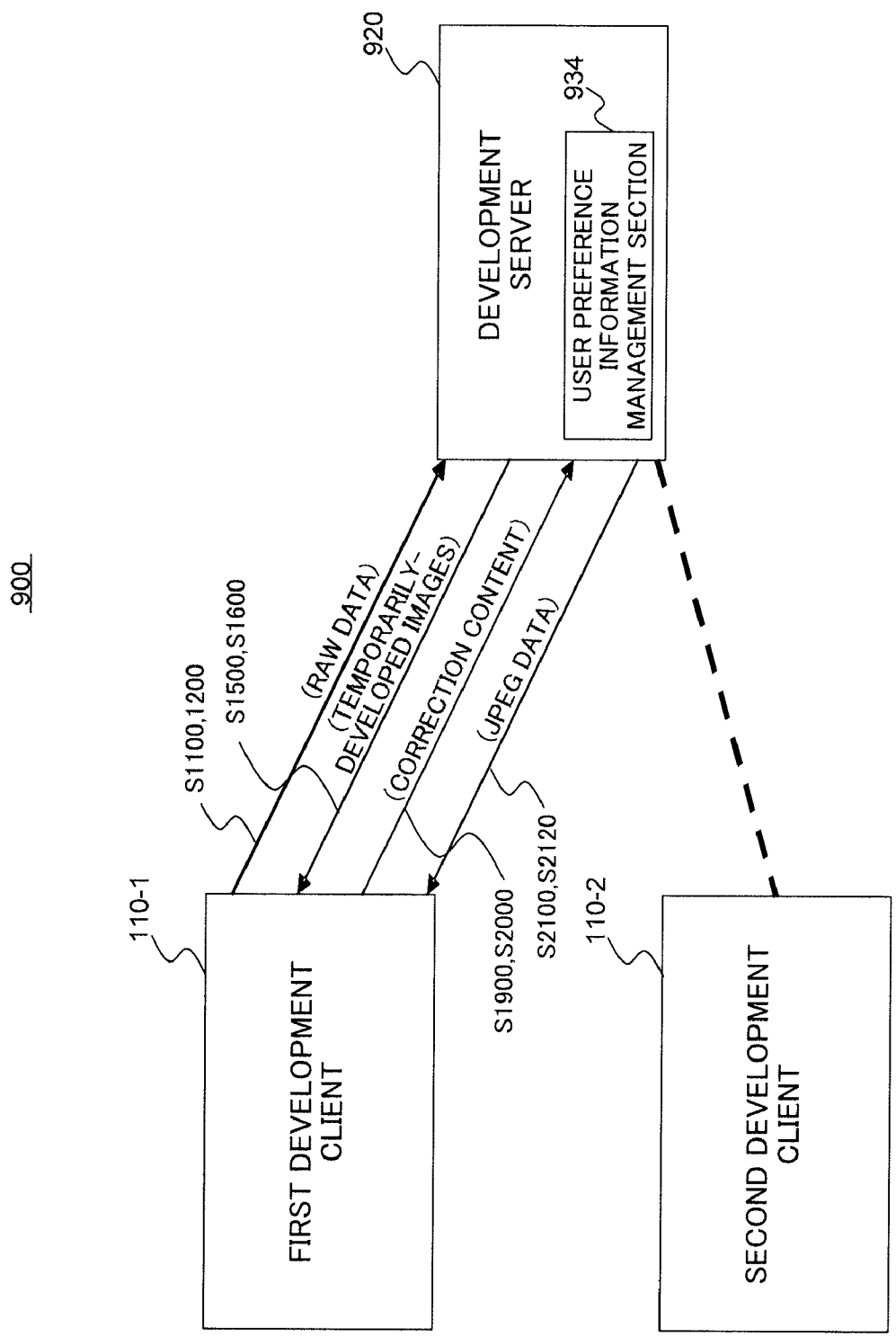
FIG. 24 is a system configuration diagram showing the configuration of a development system according to Embodiment 6 of the present invention.

FIG. 24 is a system configuration diagram showing the configuration of a development system according to Embodiment 6 of the present invention, corresponding to FIG. 19 of Embodiment 4. Parts in FIG. 24 identical to those in FIG. 19 are assigned the same reference codes as in FIG. 19, and descriptions thereof are omitted here.

In FIG. 24, development system 900 includes first and second development clients 110-1 and 110-2 having the same configuration as development client 110 in FIG. 19, and development server 920 having a different configuration from development server 720 in FIG. 19. Development server 920 has user preference information management section 934 instead of user preference information management section 734 in FIG. 19.

In response to an inquiry from digital photograph developing section 727 concerning development for a particular development client 110, user preference information management section 934 returns user preference information of another development client 110. User preference information management section 934 stores in advance a table (not shown) in which, for example, RAW data transmission sources are associated with development clients 110 corresponding to user preference information that should be used. Then each time there is an inquiry from digital photograph developing section 727, user preference information management section 934 references this table and returns corresponding user preference information.

An example of data flow in development system 900 will now be described. Here, a case will be described in which second development client 110-2 is entered in a table stored in user preference information management section 934 as development client 110 corresponding to user preference information used for first development client 110-1. Step numbers in FIG. 24 correspond to step numbers in FIG. 21 of Embodiment 4.

As shown in FIG. 24, first development client 110-1 and development server 920 perform development in accordance with the procedure shown in FIG. 21 (S1100 through S2000). Then, having received correction content, development server 920 generates JPEG data for data to be corrected in accordance with the received correction content. On the other hand, in development server 920, user preference information generated and updated based on correction parameters not from first development client 110-1 but from second development client 110-2 is selected by user preference information management section 934 for data not to be corrected, and JPEG data is generated using this selected user preference information (S2100, S2120).

On the second development client 110-2 side, use of user preference information corresponding to that apparatus for another development client 110 may be restricted. Restriction of the use of user preference information can be implemented, for example, by having development server 920 perform authentication of a RAW data transmission source using a password set by second development client 110-2. Technology for authentication processing using a password and restriction of processing thereby will be known to those skilled in the art, and therefore a description thereof is omitted here.

Also, provision may be made for user preference information generated and updated by development server 920 to be freely available to any other development client 110. Such free availability can be implemented by means of a technology that will be known to those skilled in the art, such as disclosure scope information or access control information, for example.

Thus, according to this embodiment, it is possible for a user to utilize user preference information (a user profile) generated by a development client 110 used by another user, and for a preference of another person to be reflected in a user's own development results. By this means, for example, it is possible for collaborative creation of digital image works by a plurality of users to be carried out without involving the collaborators.

Also, in development system 900 of this embodiment the same user has a plurality of development clients, making it possible to respond to a request for use by a different development client of user preference information generated and updated by a different development client. For example, there may be a case in which a user who normally performs development using a personal computer temporarily performs development using another personal computer while away on a trip. Thus, this embodiment makes it possible to cope more flexibly in the event of complex and varied user requests for RAW data development modes.

In the above-described embodiments, an acquisition destination of RAW data for a development client has been described as a memory card, but the present invention is not limited to this, and various kinds of information storage media may be used, such as an SD memory card (secure digital memory card), CompactFlash (registered trademark) memory card, Microdrive, or the like. Also, provision may be made for RAW data to be acquired from various kinds of electronic devices such as cameras. In this case, RAW data may be acquired from an electronic device by applying various publicly known data reading and data communication technologies, such as cable communication using a USB (universal serial bus) cable or wireless communication by means of a wireless LAN (local area network).

JPEG data generated by a development server may be transmitted as necessary from the development server or a development client to an external device such as a printer by means of cable communication or wireless communication.

Classification regarding the necessity or otherwise of RAW data correction has been described as being performed in a stage prior to temporarily-developed image generation, but temporarily-developed images of all RAW data may also be generated, and classification performed using the temporarily-developed images.

It has been assumed that a plurality of temporarily-developed images to which correction parameters corresponding to different image qualities are applied are generated from one item of data to be corrected, but the present invention is not limited to this. Provision may also be made for only one temporarily-developed image corresponding to one kind of correction parameter different from a basic parameter to be generated, and for selection of whether or not a corresponding correction parameter is used to be performed on the development server side.

A correction requirement rule storage section, similarity determination rule storage section, and preference extraction rule storage section may also be placed in a recording medium such as a hard disk provided externally to a development server, a database in a network, or the like. If the various above-mentioned rules are placed in a database in a network, in particular, common rules can be used by a plurality of development servers, and more consistent development quality can be achieved by a plurality of development servers. Also, rule updates and new camera models can be handled easily, enabling a more flexible development system to be implemented.

The present invention can also be applied, of course, to various kinds of image data that are difficult to develop other than RAW data. Furthermore, development results are not limited to JPEG data, and various data formats allowing easy image output may be used, such as general-purpose image formats TIFF (tagged image file format) and BMP (bit map), and the CMYK (cyan-magenta-yellow-black) image format for printing devices.

It goes without saying that a development server is not limited to a television, and various kinds of electronic devices can be used instead, such as a personal computer, PDA (personal digital assistants), or mobile phone.

The disclosure of Japanese Patent Application No. 2006-345001, filed on Dec. 21, 2006, including the specification, drawings and abstract, is incorporated herein by reference in its entirety.

INDUSTRIAL APPLICABILITY

A development server, development client, development system, and development method according to the present invention are suitable for use as a development server, development client, development system, and development method that enable an image having an image quality conforming to a user's desire and preference to be obtained more easily in the development of image data that is difficult for an individual to develop, such as RAW data.

The invention claimed is:

1. A development server comprising:
an undeveloped image data receiving section that receives undeveloped image data;
a temporarily-developed image generating section that generates a plurality of temporarily-developed images in which said undeveloped image data is developed simply by applying correction parameters corresponding to mutually different image qualities;
a temporarily-developed image transmitting section that transmits said plurality of temporarily-developed images to a development client, combining the images with correction parameters applied to respective temporarily-developed images or information indicating the parameters;
a development instruction receiving section that receives from said development client a correction parameter applied to one of said plurality of temporarily-developed images or information indicating this as an instruction to develop said undeveloped image data; and
a developing section that generates developed image data by developing said undeveloped image data by applying a correction parameter indicated by said development instruction.

2. The development server according to claim 1, wherein said temporarily-developed image generating section decides upon undeveloped image data that becomes subject to temporarily-developed image generation based on an imaging condition of each undeveloped image data from among undeveloped image data received by said undeveloped image data receiving section.

3. The development server according to claim 2, further comprising an image grouping section that sets undeveloped image data for which development should be performed by applying an identical correction parameter in an identical group based on an imaging condition of each undeveloped image data for undeveloped image data received by said undeveloped image data receiving section, wherein:
said temporarily-developed image generating section decides upon representative image data extracted from said group as undeveloped image data that becomes subject to said temporarily-developed image generation; and
said developing section develops undeveloped image data of a group to which said representative image data belongs with a correction parameter identical to a correction parameter applied to said representative image data.

4. The development server according to claim 3, wherein said image grouping section sets said undeveloped image data for which an imaging condition of undeveloped image data received by said undeveloped image data receiving section is similar in an identical group.

5. The development server according to claim 1, further comprising a data-to-be-corrected extracting section that extracts undeveloped image data for which development should be performed by applying a correction parameter different from a basic correction parameter for which a default value is set, as data to be corrected, wherein:
said temporarily-developed image generating section generates a temporarily-developed image by applying a correction parameter different from said basic correction parameter from said data to be corrected; and
said developing section takes undeveloped image data other than said data to be corrected from among said undeveloped image data as data not to be corrected, and performs development thereof by applying said basic correction parameter.

6. The development server according to claim 5, further comprising an operator interface section that shows information relating to image quality of said undeveloped image data when said basic correction parameter is applied and accepts an operator selection with respect to said undeveloped image data,
wherein said data-to-be-corrected extracting section determines undeveloped image data selected by means of said operator interface section to be said data to be corrected.

7. The development server according to claim 5, wherein said data-to-be-corrected extracting section references a correction requirement rule table containing criteria for undeveloped image data that should be developed by applying a correction parameter different from said basic correction parameter, and determines undeveloped image data satisfying said criteria to be said data to be corrected.

8. The development server according to claim 7, wherein:
content of said correction requirement rule table includes criteria relating to imaging information accompanying said undeveloped image data; and
said data-to-be-corrected extracting section acquires imaging information accompanying said undeveloped image data and checks said imaging information against content of said correction requirement rule table.

9. The development server according to claim 5, wherein said data-to-be-corrected extracting section analyzes at least one of brightness, color temperature, and noise amount of an image when said undeveloped image data is developed by applying a predetermined correction parameter, and determines undeveloped image data for which an analysis result is outside a predetermined range to be said data to be corrected.

10. The development server according to claim 1, further comprising a user preference information extraction section that extracts user preference information indicating a preference relating to a development result of a user of a transmission source of said undeveloped image data from said development instruction, wherein said developing section selects a correction parameter based on said user preference information, and develops undeveloped image data other than said data to be corrected from among said undeveloped image data by applying a selected correction parameter.

11. The development server according to claim 1, wherein said temporarily-developed image transmitting section changes a transmission destination of said temporarily-developed image according to a transmission source of said undeveloped image data.

12. The development server according to claim 9, wherein said developing section changes said user preference information used according to a transmission source of said undeveloped image data.

13. A development client comprising:
  an undeveloped image data transmitting section that transmits undeveloped image data to a development server that performs development of said undeveloped image data;
  a temporarily-developed image receiving section that receives from said development server a plurality of temporarily-developed images in which said undeveloped image data is developed simply by applying correction parameters corresponding to mutually different image qualities, combined with correction parameters applied to respective temporarily-developed images or information indicating the parameters;
  a user interface section that displays said temporarily-developed images and accepts a user selection with respect to said temporarily-developed images; and
  a development instruction transmitting section that transmits to said development server a correction parameter applied to a temporarily-developed image selected by means of said user interface section or information indicating this as an instruction to develop said undeveloped image data.

14. A development system comprising:
the development server according to claim 1.

15. A development method that is a development method in a development server that develops undeveloped image data, said development method comprising:
  a step of receiving said undeveloped image data;
  a step of generating a plurality of temporarily-developed images in which received said undeveloped image data is developed simply by applying correction parameters corresponding to mutually different image qualities;
  a step of transmitting said generated plurality of temporarily-developed images to a development client, combining the images with correction parameters applied to respective temporarily-developed images or information indicating the parameters;
  a step of receiving from said development client a correction parameter applied to one of transmitted said plurality of temporarily-developed images or information indicating this as an instruction to develop said undeveloped image data; and
  a step of generating developed image data by developing said undeveloped image data by applying a correction parameter indicated by received said development instruction.

16. A development system comprising:
the development client according to claim 13.

* * * * *